United States Patent
Lauer

(10) Patent No.: US 10,965,794 B2
(45) Date of Patent: Mar. 30, 2021

(54) ON-BOARD SELF-HEALING NETWORK FOR DELIVERY OF VEHICLE PASSENGER-CONSUMABLE CONTENT

(71) Applicant: GOGO BUSINESS AVIATION LLC, Broomfield, CO (US)

(72) Inventor: Bryan Adrian Lauer, Chicago, IL (US)

(73) Assignee: GOGO BUSINESS AVIATION LLC, Broomfield, CO (US)

( * ) Notice: Subject to any disclaimer, the term of this patent is extended or adjusted under 35 U.S.C. 154(b) by 154 days.

(21) Appl. No.: 16/053,374

(22) Filed: Aug. 2, 2018

(65) Prior Publication Data

US 2020/0045150 A1    Feb. 6, 2020

(51) Int. Cl.
| | |
|---|---|
| *H04L 29/14* | (2006.01) |
| *H04W 4/40* | (2018.01) |
| *H04W 76/10* | (2018.01) |
| *H04L 29/06* | (2006.01) |
| *H04W 84/20* | (2009.01) |

(52) U.S. Cl.
CPC .......... *H04L 69/40* (2013.01); *H04L 65/4069* (2013.01); *H04W 4/40* (2018.02); *H04W 76/10* (2018.02); *H04W 84/20* (2013.01)

(58) Field of Classification Search
CPC ................. H04L 65/4069; H04L 69/40; H04L 2012/40273; H04W 4/40; H04W 76/10; H04W 84/20
See application file for complete search history.

(56) References Cited

U.S. PATENT DOCUMENTS

| | | | |
|---|---|---|---|
| 6,813,777 B1 | 11/2004 | Weinberger et al. | |
| 7,028,304 B1 | 4/2006 | Weinberger et al. | |
| 7,185,236 B1 * | 2/2007 | Moser ................. | G06F 11/2028 709/209 |
| 7,218,644 B1 | 5/2007 | Heinonen et al. | |

(Continued)

OTHER PUBLICATIONS

International Application No. PCT/US2019/044815, International Search Report and Written Opinion, dated Oct. 16, 2019.

*Primary Examiner* — Michael C Lai
(74) *Attorney, Agent, or Firm* — Marshall, Gerstein & Borun LLP; Randall G. Rueth

(57) ABSTRACT

A self-healing network on-board a vehicle includes multiple wireless devices that are directly and communicatively interconnected via communications backbone(s). One of devices is collectively determined by the other devices to be a lead device of the network, and therefore establishes a wireless link (e.g., an only wireless link) communicatively connecting any of the self-healing network devices to other devices/servers on-board the vehicle and external to the network. Passenger-consumable content may be delivered between any device of the self-healing network and the other on-board, external devices via the lead wireless device, its established wireless link, and the communications backbone(s). Any wireless device of the self-healing network may serve as a hot spare for the lead wireless device, so that the self-healing network may automatically reconfigure to mitigate and recover from faults, e.g., by automatically forming multiple, mutually exclusive sub-self-healing networks, each of which has its own cooperatively selected lead wireless device.

21 Claims, 6 Drawing Sheets

(56) References Cited

U.S. PATENT DOCUMENTS

| | | | |
|---|---|---|---|
| 7,483,696 B1 * | 1/2009 | Mitchell | H04B 7/18508 |
| | | | 455/427 |
| 7,675,849 B2 * | 3/2010 | Watson | E04G 21/10 |
| | | | 370/217 |
| 7,945,934 B2 * | 5/2011 | Margis | H04N 7/163 |
| | | | 725/74 |
| 8,184,974 B2 | 5/2012 | Cline | |
| 8,402,268 B2 | 3/2013 | Dierickx | |
| 8,612,581 B1 | 12/2013 | Craig et al. | |
| 8,751,646 B1 * | 6/2014 | Heron | H04L 67/104 |
| | | | 709/224 |
| 8,843,969 B2 | 9/2014 | Royster | |
| 9,016,627 B2 | 4/2015 | Margis et al. | |
| 9,095,001 B2 | 7/2015 | Lemmon et al. | |
| 9,245,303 B2 | 1/2016 | Ogilvie | |
| 9,315,157 B2 | 4/2016 | Jahn | |
| 9,462,300 B2 | 10/2016 | Couleaud et al. | |
| 9,469,400 B1 | 10/2016 | Irmen | |
| 9,473,260 B2 | 10/2016 | Hommel et al. | |
| 9,668,109 B2 | 5/2017 | Bourlas et al. | |
| 9,958,956 B2 | 5/2018 | Jiang et al. | |
| 9,961,373 B2 | 5/2018 | Margis et al. | |
| 2002/0116460 A1 * | 8/2002 | Treister | H04W 84/20 |
| | | | 709/204 |
| 2009/0016262 A1 * | 1/2009 | Kulkarni | H04W 24/08 |
| | | | 370/328 |
| 2011/0219407 A1 * | 9/2011 | Margis | H04N 7/163 |
| | | | 725/75 |
| 2012/0320824 A1 * | 12/2012 | Bari | H04W 76/10 |
| | | | 370/328 |
| 2013/0124664 A1 * | 5/2013 | Fonseca, Jr. | H04L 67/125 |
| | | | 709/208 |
| 2014/0188920 A1 * | 7/2014 | Sharma | G06F 16/635 |
| | | | 707/758 |
| 2015/0230160 A1 * | 8/2015 | Lin | H04W 76/18 |
| | | | 370/252 |
| 2016/0248831 A1 | 8/2016 | Watson et al. | |
| 2017/0171272 A1 * | 6/2017 | Smereka | H04W 4/44 |
| 2018/0124040 A1 | 5/2018 | Watson et al. | |
| 2018/0124154 A1 | 5/2018 | Watson et al. | |
| 2018/0167789 A1 * | 6/2018 | Tsuchida | G06F 13/00 |
| 2019/0044935 A1 * | 2/2019 | Bari | H04W 4/06 |
| 2019/0332347 A1 * | 10/2019 | Cedborg | G06F 3/165 |

* cited by examiner

ON-BOARD SELF-HEALING NETWORK FOR DELIVERY OF VEHICLE PASSENGER-CONSUMABLE CONTENT

TECHNICAL FIELD

The instant disclosure generally relates to a self-healing network of passenger-facing wireless devices disposed on-board a vehicle for delivering content for consumption by passengers who are on-board the vehicle.

BACKGROUND

Content, such as digital content, that is available and able to be presented to and consumed by passengers on-board the vehicle (e.g., while the vehicle is in transit or en route between an origination location and a destination location) may include safety procedures, instructions, and other safety information; entertainment offerings such as movies, television shows, etc.; real-time maps and other information describing the vehicle's progression along the travel route and/or other information related to the travel route (e.g., estimated time of arrival, arrival gate, baggage carousel, weather, etc.); shopping, retail, and/or other marketing portals/information; and the like. Such content may be delivered for presentation to and consumption by passengers at user interfaces of on-board passenger-facing electronic devices, some of which may be installed on the vehicle, e.g., in seatbacks, in or on walls or ceilings of the vehicle cabin, etc. Additionally or alternatively, passenger-consumable content may be delivered for presentation to and consumption by passengers at user interfaces of personal, portable electronic devices ("PEDs") which users have brought onto the vehicle, e.g., laptop computers, tablets, smart phones, smart devices, etc. Some of the passenger-consumable content, such as safety procedures and information, may be broadcasted to on-board passenger-facing devices, and some of the passenger-consumable content may be individually requested by passengers at respective passenger-facing devices for individual presentation and consumption (e.g., movies, television shows, and/or other entertainment programming, shopping portals, etc.).

Passenger-consumable content may be obtained by on-board passenger-facing devices via one or more on-board servers to which the on-board passenger-facing devices are communicatively connected via one or more on-board communications networks. The on-board servers may store at least some of the available passenger-consumable content. For example, some of the passenger-consumable content may be loaded onto and stored at the on-board servers while the vehicle is parked or otherwise is in-between travel routes. In some scenarios, some of the passenger-consumable content may be loaded onto and stored at the on-board servers while the vehicle is in transit or otherwise en route, e.g., via satellites and/or other type of air-to-ground communication links established between the in-transit vehicle and ground stations. In some scenarios, some of the passenger-consumable content (e.g., real-time porting events, news flashes, and the like) may be streamed or otherwise delivered to the on-board servers for in-time delivery to various on-board passenger-facing devices while the vehicle is in transit, e.g., via satellites and/or other type of air-to-ground communication links established between the vehicle and ground stations.

On-board the vehicle, the one or more servers may deliver passenger-consumable content to one or more passenger-facing devices via one or more on-board communications networks, e.g., via streaming, download, establishing sessions, and/or by using any other suitable communications protocol and/or delivery mechanism. Mitigation of faults and/or degraded performance of the on-board-communications network and/or nodes thereof which may occur during vehicle transit is important not only to enhance and preserve the on-board experience and satisfaction of passengers, but also is critically important in emergency situations during which safety instructions and/or information must be timely and accurately delivered to passengers.

Known techniques for mitigating faults and/or degraded performance within on-board communications networks and nodes typically rely on the on-board servers, head-end devices, and human users to manage the mitigation and recovery from the faults. For example, U.S. Pat. No. 7,028,304 utilizes servers and head-end equipment to route content to installed seat devices, and when faults occur, the system notifies users by illuminating an LED, logging a fault, etc. In another example, U.S. Pub. No. 20180248831 provides "seatboxes" that switch between and otherwise manage the usage of redundant communication paths between installed passenger-facing devices, such as when a fault is detected on one of the paths. However, in these architectures, faults that occur at single points of failure (e.g., the head-end equipment, the seatboxes, etc.) and/or faults that occur across all available redundant communication paths are not able to be addressed and recovered from without human intervention. As such, at least some passengers whose devices are affected by such types of faults may not be able to timely receive critical information during their journey, if at all.

BRIEF SUMMARY OF THE DISCLOSURE

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

Embodiments of a self-healing network for delivering content for consumption by passengers via passenger-facing devices on-board a vehicle are disclosed. The self-healing network may include a plurality of wireless devices that are disposed on-board the vehicle and that are communicatively interconnected, e.g., via one or more communications backbones or networks. Each wireless device included in the plurality of wireless devices may be passenger-facing, and may include a respective user interface, a respective processor, a respective memory, and respective computer-executable instructions stored on the respective memory. The computer-executable instructions, when executed by the respective processor, may cause each wireless device to cooperate with the other wireless devices of the self-healing network to determine that a particular wireless device of the plurality of wireless devices is to function as a lead wireless device of the self-healing network, e.g., via an election or other suitable cooperative selection process. When the each wireless device is determined by the plurality of wireless devices to function as the lead wireless device of the self-healing network, the computer-executable instructions may cause the each wireless device to establish, via a wireless transceiver included in the each wireless device, a wireless link to thereby communicatively connect any wireless device of the plurality of wireless devices of the self-healing network with one or more servers. The one or more servers may disposed on-board the vehicle and may store passenger-consumable content thereon. Additionally or alternatively, the one or more servers may dynamically receive (and optionally store) passenger-consumable content while the vehicle is in transit, e.g., via a satellite network and/or other air-to-ground communications network. Each wireless device, while functioning as the lead wireless device of the self-healing network, may serve as a gateway (i) between the plurality of wireless devices of the self-healing network and the one or more servers, and (ii) via which respective at least portions of the passenger-consumable content are delivered to respective wireless devices of the self-healing network.

Embodiments of a method for self-healing a network that is on-board a vehicle and that is for delivering content for consumption by passengers on-board the vehicle are disclosed. The first self-healing network may include a particular wireless device and one or more other wireless devices that are communicatively interconnected. One of the one or more other wireless devices may be a first lead wireless device of the first self-healing network that supports a first wireless link communicatively connecting the plurality of wireless devices included in the first self-healing network with one or more on-board servers. The method may include detecting that the particular wireless device is or has become communicatively disconnected from the first lead wireless device of the first self-healing network. In an embodiment, the particular wireless device may detect that it has become communicatively disconnected from the first lead wireless device.

The method may further include, based on the detection, cooperating, between the particular wireless device and other wireless devices, to form a second self-healing network. The other wireless devices with which the particular wireless device cooperates may also have been included in the first self-healing network and may also be communicatively disconnected from the first lead wireless device, while remaining communicatively connected to the particular wireless device. The cooperation amongst the particular wireless device and the other wireless devices may include collectively determining that a particular wireless device of the second self-healing network is to function as a second lead wireless device of the second self-healing network, and as such is to establish a second wireless link that communicatively connects the set of wireless devices that form the second self-healing network to the one or more on-board servers. For example, the particular wireless device and the other wireless devices may elect or perform some other suitable cooperative selection process to determine which device amongst them is to serve as the second lead wireless device of the second self-healing network.

The method may further receiving or obtaining passenger-consumable content at the particular wireless device, where the passenger-consumable content is delivered from the on-board server to the particular wireless device via the second wireless link and the second lead wireless device. Additionally, the method may include presenting the received passenger-consumable content at a user interface of the particular wireless device.

DETAILED DESCRIPTION

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

Exemplary On-Board Self-Healing Network

Figure 1:
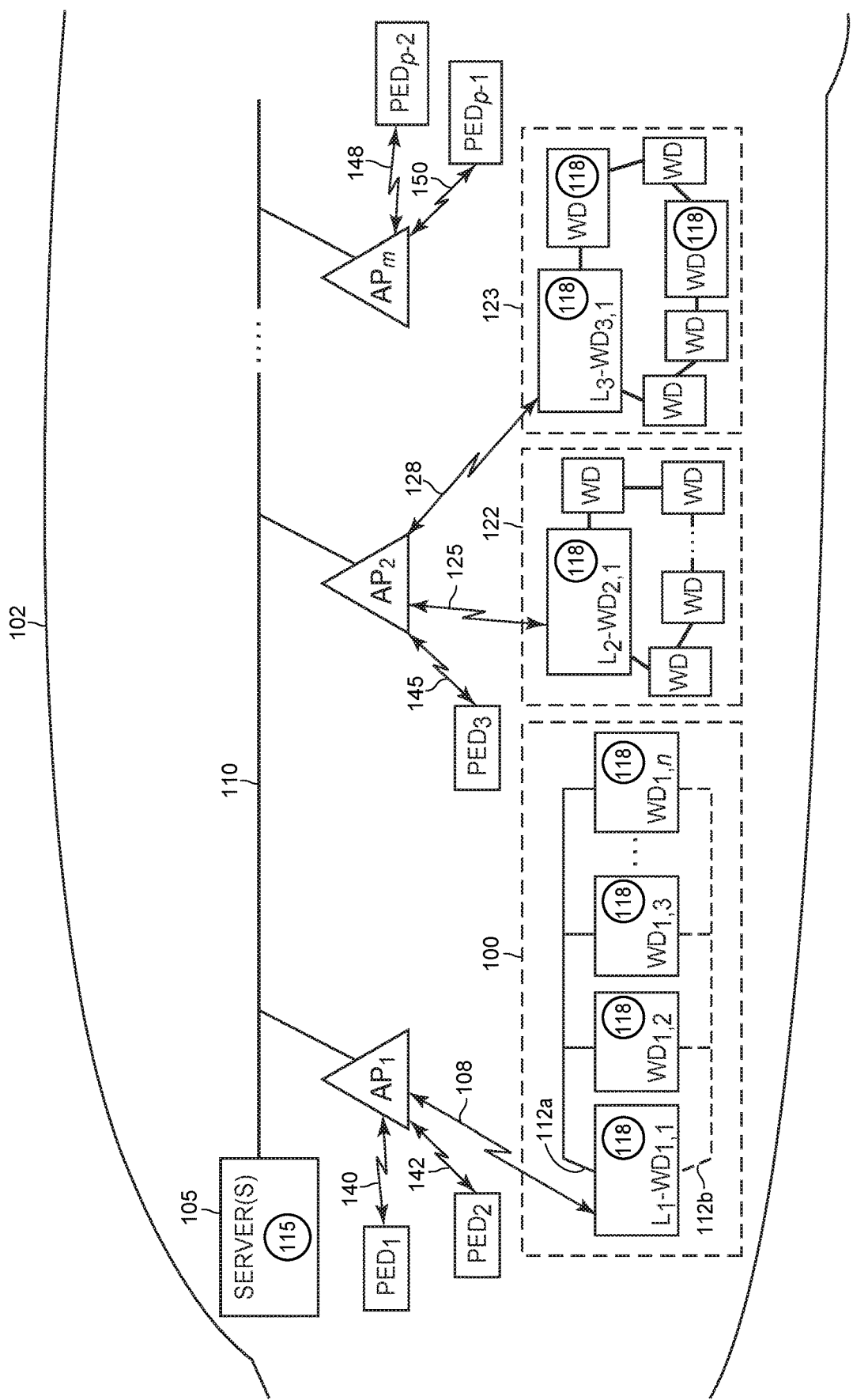
FIG. 1 illustrates a block diagram of an example self-healing network that is configured to deliver content for consumption by passengers on-board a vehicle.

FIG. 1 is a block diagram depicting an example self-healing network 100 that is located on-board a vehicle 102 and that delivers content or information (e.g., digital content or information) for consumption by passengers who are on-board the vehicle 102. In an embodiment, the self-healing network 100 may deliver content or information (e.g., in the form of electronic data) that is presented on respective user interfaces of one or more of a plurality of wireless devices $WD_{x,y}$ disposed within a cabin of the vehicle 102 and of which the self-healing network 100 is comprised. That is, as depicted in the embodiment illustrated in FIG. 1, the plurality of wireless devices $WD_{1,1}$-$WD_{1,n}$ are nodes of the self-healing network 100, where each wireless device $WD_{1,1}$-$WD_{1,n}$ is configured to receive and present, on its respective user interface, respective content for passenger consumption. For ease of reading, such content, information, or data that is available for consumption by on-board passengers is generally referred to herein as "passenger-consumable content," and least some of the available passenger-consumable content may be stored (e.g., during the duration of vehicle transit) on one or more servers 105 that are disposed on-board the vehicle 102. Examples of available passenger-consumable content may include, for example, safety information, food and beverage service information, safety information, weather information, flight or vehicle route information, movies, television shows, and other types of on-board entertainment, retail or shopping information, and the like. Additionally, although the vehicle 102 is illustrated in FIG. 1 as being an aircraft, this illustration is non-limiting, as the self-healing network 100 may be implemented in any type of vehicle that transports people, such as airplanes, trucks, automobiles, busses, trains, boats, ships, barges, subway cars, other air-borne, water-borne, or land-borne vehicles, and vehicles that are suitable for space travel.

As shown in FIG. 1, one of the wireless devices $WD_{1,1}$ of the self-healing network 100 serves as the lead wireless device of the self-healing network 100, and thus is so denoted by the prefix $L_1$. The lead wireless device $L_1$-$WD_{1,1}$ may provide the only or sole communicative connection 108 between the self-healing network 100 and the one or more servers 105. That is, the lead wireless device $L_1$-$WD_{1,1}$ may be the only node or wireless device of the plurality of $WD_{1,1}$-$WD_{1,n}$ included in a self-healing network 100 that has a direct communicative connection (either wired or wireless) with another device that is not included in the self-healing network 100, and via which the communicative connection between any of the wireless devices $WD_{1,1}$-$WD_{1,n}$ of the self-healing network 100 and the one or more servers 105 is implemented. For example, the lead wireless device $L_1$-$WD_{1,1}$ may establish and support a wireless link 108 to a wireless access point AP1 disposed on the vehicle 102, which in turn may be connected in a wired manner to the one or more on-board servers 105, e.g., via a wired link or network 110. In an example implementation, the wireless link 108 may be a Wi-Fi or IEEE 802.11ac compliant link, although other suitable wireless technologies may be suitable and/or utilized for the link 108. In an example implementation, the wired link or network 110 may be an Ethernet network, although other suitable wired technologies may be suitable and/or utilized for the link/network 110.

Within the self-healing network 100, the nodes or wireless devices $WD_{1,1}$-$WD_{1,n}$ may be directly and communicatively interconnected via one or more communication backbones 112a, 112b. Each backbone 112a, 112b is different, separate, and distinct from the wireless link 108 utilized by the lead wireless device $L_1$-$WD_{1,1}$ to communicatively connect with the one or more servers 105, and each backbone 112a, 112b, directly interfaces with only with the wireless devices $WD_{1,1}$-$WD_{1,n}$ of the self-healing network 100. That is, only the wireless devices $WD_{1,1}$-$WD_{1,n}$ (and not other on-board devices) are nodes of the self-healing network 100. In an embodiment, each of the nodes or wireless devices $WD_{1,1}$-$WD_{1,n}$ includes a respective wired interface via which the node or wireless devices $WD_{1,1}$-$WD_{1,n}$ directly and communicatively connects to one of the communications backbones 112a, which in the embodiment illustrated in FIG. 1, is implemented using wired communications technology. For example, the wired interfaces of the nodes or wireless devices $WD_{1,1}$-$WD_{1,n}$ and the communication backbone 112a may be implemented utilizing Ethernet technology (e.g., IEEE 802.3 compliant over copper or fiber optic), AC/DC power lines, USB (Universal Serial Bus), and/or any other suitable wired communications technology. In some arrangements, each of the nodes or wireless devices $WD_{1,1}$-$WD_{1,n}$ includes a respective wireless interface via which the node or wireless devices $WD_{1,1}$-$WD_{1,n}$ directly and communicatively connects to another one of the communication backbones 112b which utilizes wireless communications technology. For example, the wireless interfaces of the nodes or wireless devices $WD_{1,1}$-$WD_{1,n}$ and the communication backbone 112b may be implemented utilizing a Bluetooth, an infrared, a short-range, or a Wi-Fi or 802.11 wireless connection of a different channel and/or frequency than that which is utilized for the wireless link 108, and/or any other suitable wireless communications technology. The self-healing network 100 may include multiple wired communications backbones, and/or multiple wireless communications backbones 112b, if desired. In a preferred embodiment, the self-healing network 100 includes a wired communications backbone 112a and one other communications backbone which may be implemented utilizing wired or wireless technology. Typically, but not necessarily, one of the backbones 112a, 112b is designated or utilized by the nodes of the self-healing network 100 as a primary communications backbone, and the other one of the backbones 112a, 112b is designated or utilized as secondary, back-up, or redundant backbone. In an embodiment, a wired communications backbone 112a may be utilized as a primary communications backbone between nodes of the network 100.

Exemplary Distributed Storage and Delivery of Passenger-Consumable Content

At least some of the passenger-consumable content may be received onto the vehicle 102 and stored, as denoted by reference 11, on board the vehicle 102 at the one or more servers 105. For example, passenger-consumable content 115 may be loaded from one or more off-board devices or systems onto the one or more servers 105, e.g., while the vehicle 102 is docked or parked at a port, and/or while the vehicle 102 is in transit. The passenger-consumable content 115 that is stored on the one or more servers 105 may include content that is to be broadcasted to multiple passenger-facing devices, such as safety information, emergency alerts, etc. Additionally or alternatively, the passenger-consumable content 115 that is stored on the one or more servers 105 may include on-demand or other content that is able to be individually requested by a passenger via one of the wireless devices $WD_{1,1}$-$WD_{1,n}$ such as movies, television shows, food and drink menus, retail catalogs and information, etc. In some implementations, at least some of the loaded, server-stored passenger-consumable content 115 may be transferred, copied, streamed, and/or otherwise delivered to one or more devices $WD_{1,1}$-$WD_{1,n}$ of the self-healing network 100 via the wireless link 108, the lead wireless device $L_1$-$WD_{1,1}$, and one or more of the communications backbones 112a, 112b of the self-healing network 100, e.g., upon passenger request via one of the wireless devices $WD_{1,1}$-$WD_{1,n}$ upon request by the lead wireless device$L_1$-$WD_{1,1}$, and/or upon initiation of the delivery of passenger-consumable content 115 by the one or more servers 105.

In an embodiment, at least a portion of the initially loaded passenger-consumable content 115 may be transferred from the one or more servers 105 and/or from other devices un-for the vehicle 102 to one or more devices $WD_{1,1}$-$WD_{1,n}$ so that the passenger-consumable content 115 is distributively stored on-board the vehicle 102, e.g., across the one or more servers 105 (as denoted by reference 115) and at one or more wireless devices $WD_{1,1}$-$WD_{1,n}$, (as denoted by references 118). For example, the portion(s) of the initially loaded passenger-consumable content 115 that are to be distributively stored on board the vehicle 102 may be predetermined, and/or may be selected. In this embodiment, device-stored passenger-consumable content 118 may be directly accessed by wireless devices $WD_{1,1}$-$WD_{1,n}$ of the self-healing network 100 without having to utilize the external (that is, "external" with respect to the self-healing network 100) wireless link 108. Other devices that are on-board the vehicle 102 (e.g., other wireless devices included in other self-healing networks, or other computing devices) may request to obtain the device-stored passenger-consumable content 118 stored within the self-healing network 100 via the one or more servers 105 and/or via the lead wireless device $L_1$-$WD_{1,1}$. For example, the one or more servers 105 and/or the lead wireless device $L_1$-$WD_{1,1}$ may store a respective mapping or indication of which portions of the initially loaded passenger-consumable content 115 have been transferred to be persistently stored on-board the vehicle 102 at which particular non-server devices and/or at which particular self-healing networks. As such, in this embodiment, the one or more servers 105 and/or the lead wireless device $L_1$-$WD_{1,1}$ may serve as a receiving and distribution node for at least a portion of the initially loaded passenger-consumable content 115. Advantageously, this embodiment may reduce the amount of storage that is utilized by the one or more servers 105, as well as reducing the bandwidth of external wireless link 108 that is utilized by the plurality of wireless devices $WD_{1,1}$-$WD_{1,n}$ to obtain passenger-consumable content.

In an embodiment, at least a portion of the initially loaded passenger-consumable content 115 may be copied from the one or more servers 105 (and/or from other devices on-board the vehicle 102) to one or more devices $WD_{1,1}$-$WD_{1,n}$ of the self-healing network 100, e.g., so that multiple copies of the selected passenger-consumable content 118 may be locally stored on-board the vehicle 102 at multiple locations. For example, the portion(s) of the initially loaded passenger-consumable content 115 that are to be copied to the respective memories of one or more of the devices $WD_{1,1}$-$WD_{1,n}$ (and/or of other devices on board the vehicle 102) may be predetermined, and/or may be selected. Advantageously, this embodiment provides redundancy of content 118 to thereby mitigate situations in which a node becomes unavailable, a communication link becomes unavailable, and/or a particular copy of the passenger-consumable content 115, 118 becomes corrupted. Another advantage of this embodiment is the direct and/or quicker local access to passenger-consumable content 118 by other devices of the self-healing network 100, e.g., via the one or more communications backbones 112a, 112b. Further, this configuration may be particularly useful for decreasing the utilized bandwidth and/or increasing the capacity of the wireless link 108, and may be particularly suitable for content that may be presented at a large number of on-board devices, such as vehicle safety information, on-board entertainment catalogs, popular movies, etc. In an implementation, the one or more servers 105 and/or the lead wireless device $L_1$-$WD_{1,1}$ may store a mapping an indication of which portions of the initially loaded passenger consumable content 115 have been copied to and persistently stored at which particular devices $WD_{1,1}$-$WD_{1,n}$ of the self-healing network 100, e.g., so that other devices may request and/or access the copies.

In an embodiment, at least a portion of the initially loaded passenger-consumable content 115 may be transferred and/or copied to the lead wireless device $L_1$-$WD_{1,1}$ for local, persistent storage thereon (reference 118 at $L_1$-$WD_{1,1}$), e.g., from the one or more servers 105 and/or from other devices on-board the vehicle 102 via the wireless link 108 to the lead wireless device $L_1$-$WD_{1,1}$ In this embodiment, the lead wireless device $L_1$-$WD_{1,1}$ may operate as a local server of the self-healing network 100 storing at least some passenger-consumable content 118 that is directly and locally accessible, via one or of the communications backbones 112a, 112b, to the wireless devices $WD_{1,1}$-$WD_{1,n}$ of the network 100, and/or to other devices on-board the vehicle 102.

In some embodiments, at least some of the passenger-consumable content may be additionally or alternatively loaded onto the vehicle 102 and initially stored locally 118 in the respective memories of one or more wireless devices $WD_{1,1}$-$WD_{1,n}$ of the self-healing network 100 (as contrasted with being loaded and initially stored at the one or more servers 105, as discussed above). For example, passenger-consumable content 118 may be loaded onto a memory of one of the wireless devices $WD_{1,1}, \ldots, WD_{1,n}$ while the device $WD_{1,1}, \ldots, WD_{1,n}$ is not yet disposed on-board the vehicle 102. Upon the device $WD_{1,1}, \ldots, WD_{1,n}$ being disposed on-board the vehicle (e.g., upon the device's installation), and upon respective communications connections being established between the on-board wireless device $WD_{1,1} \ldots, WD_{1,n}$ and the one or more communications backbones 112a, 112b, the passenger-consumable content 118 stored on the device $WD_{1,1} \ldots, WD_{1,n}$ may be made available to other nodes or devices of the self-healing network 100. For example, the device $WD_{1,1}, \ldots, WD_{1,n}$ that initially locally stores passenger-consumable content 118 on-board the vehicle 102 may broadcast, to one or more other nodes of the network 100, its stored content 118 (or an indication of its stored content) to one or more other nodes of the network 100. Additionally or alternatively, the device $WD_{1,1} \ldots, WD_{1,n}$ that initially locally stores passenger-consumable content 118 on-board the vehicle 102 may provide at least a portion of its stored content 118 when requested to do so by another node or device of the network 100. Still additionally or alternatively, in some situations the lead wireless device $L_1$-$WD_{1,1}$ of the self-healing network 100 may detect that a new wireless device has joined the network 100 (or, in some situations, that a previous wireless device is no longer included in the network and a new wireless device has joined in the previous wireless device's place, such as when a wireless device installed in a seatback is replaced), and the lead wireless device $L_1$-$WD_{1,1}$ may dialogue with the newly joined wireless device to obtain any additional passenger-consumable content stored at the newly joined wireless device, and/or indications thereof.

In some embodiments, upon initialization of the device $WD_{1,1}, \ldots, WD_{1,n}$ at which at least some passenger-consumable content 118 is initially stored, at least some of the initially-stored content 118 of the device $WD_{1,1}, \ldots, WD_{1,n}$ may be provided to the lead wireless device $L_1$-$WD_{1,1}$ of the self-healing network 100 (e.g., via one or more of the communications backbones 112a, 112b) for local persistent storage on a memory of the lead wireless device $L_1$-$WD_{1,1}$. As such, other devices $WD_{1,2}, \ldots, WD_{1,n}$ of the self-healing network 100 may locally obtain the passenger-consumable content 118 from the lead wireless device $L_1$-$WD_{1,1}$ upon passenger request, upon instruction by the lead wireless device $L_1$-$WD_{1,1}$ or at some other time without having to utilize any links that are external to the self-healing network 100, such as the wireless link 108 and/or the network 110.

Similarly, in some embodiments, the lead wireless device $L_1$-$WD_{1,1}$ may distribute (e.g., may transfer and/or copy) passenger-consumable content 118 that was initially loaded onto and locally stored at one or more of the wireless devices $WD_{1,1}$-$WD_{1,n}$ via the wireless link 108 for localized, persistent storage at one or more other lead wireless devices (e.g., $L_2$-$WD_{2,1}$ and $L_3$-$WD_{3,5}$ illustrated in FIG. 1), for example, so that the content 118 may be made locally available to other self-healing networks 122, 123 on-board the aircraft 102.

In some embodiments, upon initialization of the device $WD_{1,1}, \ldots, WD_{1,n}$ at which at least some passenger-consumable content 118 is initially stored, at least some of the content 118 that is initially loaded onto and stored at the device $WD_{1,1}, \ldots, WD_{1,n}$ may be provided to the one or more servers 105 (e.g., via one or more of the communications backbones 112a, 112b and the wireless link 108) for persistent storage at the one or more servers 105. That is, passenger-consumable content 118 that is initially received onto the vehicle 102 via one of the wireless devices $WD_{1,1}, \ldots, WD_{1,n}$ (and/or respective indications thereof) may be forwarded or otherwise provided to the one or more vehicle servers 105 so that the passenger-consumable content 118 is made available to other on-board devices.

Additionally or alternatively, the lead wireless device $L_1$-$WD_{1,1}$ may provide, to the one or more servers 105 and/or to one or more other lead wireless devices $L_2$-$WD_{2,1}$ and $L_3$-$WD_5$, an indication of the passenger-consumable content 118 that has been newly loaded into its network 100 so that the one or more servers 105 and/or the one or more other lead wireless devices $L_2$-$WD_{2,1}$ and $L_3$-$WD_5$ may update their respective routing records or tables to reflect the presence of the passenger-consumable content that is available and persistently stored in various device(s) of the self-healing network 100.

In some implementations, and as shown in the embodiment depicted in FIG. 1, the vehicle 102 may include one or more other on-board self-healing networks 122, 123, each having an architecture that is generally similar to the architecture of the self-healing network 100. Each self-healing network 100, 122, 123 may include different numbers of wireless devices or nodes, and one of the wireless devices of each self-healing network 100, 122, 123 may serve as the lead wireless device of its respective self-healing network 100, 122, 123. For example, as illustrated in FIG. 1, self-healing network 122 includes lead wireless device $L_2$-$WD_{2,1}$ and self-healing network 123 includes lead wireless device $L_3$-$WD_5$. Further, each lead wireless device $L_1$-$WD_{1,1}$, $L_2$-$WD_{2,1}$, $L_3$-$WD_{3,5}$ may establish and maintain a respective wireless link 108, 125, 128 to a respective access point AP1, AP2, . . . , APm disposed within the vehicle 102, to thereby serve as a gateway between its self-healing network and other networks and/or devices on-board the vehicle 102. Each access point may service one or more lead wireless devices $L_1$-$WD_{1,1}$, $L_2$-$WD_{2,1}$, $L_3$-$WD_{3,5}$.

As previously discussed, respective portions of passenger-consumable content that is initially loaded onto the vehicle 102 via the one or more servers 105 (e.g., content 115) and/or via one or more wireless devices (e.g., content 118) may be transferred and/or copied, via respective wireless links 108, 125, 128, to multiple lead wireless devices $L_1$-$WD_{1,1}$, $L_2$-$WD_{2,1}$, $L_3$-$WD_{3,5}$ of multiple self-healing networks 100, 122, 123 for localized, persistent storage thereon. As such, in these embodiments, respective portions of the initially loaded passenger-consumable content 115, 118 may be distributively and persistently stored across multiple lead wireless devices $L_1$-$WD_{1,1}$, $L_2$-$WD_{2,1}$, $L_3$-$WD_{3,5}$ on-board the vehicle 102. Thus, in a sense, the multiple lead wireless devices $L_1$-$WD_{1,1}$, $L_2$-$WD_{2,1}$, $L_3$-$WD_{3,5}$ (and, in some implementations, the one or more servers 105) may collectively operate as an on-board distributed server system for passenger-consumable content 115, 118. It is noted that not all lead wireless devices $L_1$-$WD_{1,1}$, $L_2$-$WD_{2,1}$, $L_3$-$WD_{3,5}$ on-board the vehicle 102 need be included in the distributed server system for passenger-consumable content 115, 118. It is also noted that in some implementations, a particular node of the on-board distributed server system may serve as a source node for a first portion of passenger-consumable content, may store a copy (but not be a source node) for a second portion of passenger-consumable content, and may request other portions of passenger-consumable content from the requested content's respective source nodes.

Generally speaking, various portions of available, on-board passenger-consumable content 115, 118 may be initially loaded onto the vehicle at the one or more servers 105, and/or via one or more of the wireless devices included in the one or more on-board self-healing networks 100, 122, 123. Initially loaded passenger-consumable content 115, 118 may be distributively and persistently stored across multiple devices on-board the vehicle 102, for example, at the one or more servers 105, the one or more lead wireless devices $L_1$-$W_{1,1}$, $L_2$-$WD_{2,1}$, $L_3$-$WD_{3,5}$, and/or one or more other wireless devices of various on-board self-healing networks that are not serving as lead wireless devices. Mappings, routing records, or other indications of which particular portions of the initially loaded passenger-consumable content 115, 118 are stored at which particular devices may be stored or maintained at the one or more servers 105 and/or at the multiple lead wireless devices $L_1$-$WD_{1,1}$, $L_2$-$WD_{2,1}$, $L_3$-$WD_{3,5}$ so that other devices may obtain or access passenger-consumable content that is distributively stored at various devices on-board the vehicle 102.

Further, passenger-consumable content 115, 118 (and indeed, any other types of communications) may be delivered between the wireless devices of each self-healing network 100, 122, 123 using any suitable network topology, routing scheme, and/or protocol. Turning to self-healing network 100 as an illustrative example, wireless devices $WD_{1,1}$-$WD_{1,n}$ of the self-healing network 100 may be interconnected via the one or more communications backbones 112a, 112b using any suitable network topology, routing scheme, and/or protocol. For example, the self-healing network 100 may be implemented as a token-ring network, and as such may utilize routing schemes and/or protocols that are suitable for delivering information between nodes of a token-ring. In another example, the self-healing network 100 may be implemented or configured as a mesh network and may utilize routing schemes and/or protocols that are suitable for delivering information between nodes of a mesh network. In yet another example, the self-healing network 100 may include a hub (which is not illustrated in FIG. 1) to which each of the wireless devices $WD_{1,1}$-$WD_{1,n}$ has a direct communicative connection via one or more of the communications backbones 112a, 112b. In this example, the self-healing network 100 may utilize routing schemes and/or protocols that are suitable for delivering information between nodes of a hub-and-spoke network. Other network topologies that may be utilized for the self-healing network 100 may include, for example, peer-to-peer or other non-hierarchical topologies, or hierarchical topologies such as client-server.

For example, in an embodiment, the lead wireless device $L_1$-$WD_{1,1}$ may operate as a local server of the self-healing network 100, and the remaining wireless devices $WD_{1,2}$-$WD_{1,n}$ may operate as clients of the lead wireless device $L_1$-$WD_{1,1}$. In these embodiments, the lead wireless device $L_1$-$WD_{1,1}$ may maintain knowledge of passenger-consumable content or types thereof that it has stored and that is stored at various nodes of its self-healing network 100 (if any), as well as passenger-consumable content or types thereof that is stored at the one or more servers 105 and/or at other lead wireless devices $L_2$-$WD_{2,1}$ and $L_3$-$WD_5$. The lead wireless device $L_1$-$WD_{1,1}$ may obtain any requested passenger-consumable content on behalf of the wireless devices $WD_{1,1}$-$WD_{1,n}$ of the self-healing network 100, in some implementations.

In some implementations, each of the wireless devices $WD_{1,1}$-$WD_{1,n}$ may logically appear as a client device of the one or more servers 105, and may communicate with the one or more servers 105 using suitable client/server messaging and/or protocols. In these implementations, the communications backbones 112a, 112b and/or via the wireless link 108 may be transparent to the client-server messaging logic, and as such may serve as or be viewed as a transport layer.

In some implementations, each self-healing network 100, 122, 123 may have a logical appearance of a respective network that is separate and distinct from the other self-healing networks 100, 122, 123, and that is separate and distinct from the wireless network(s) in which wireless links (including wireless links 108, 125, 128) that are supported by the wireless access points AP1 through APm on-board the vehicle 102 are included. In these implementations, each lead wireless device $L_1$-$WD_{1,1}$, $L_2$-$WD_{2,1}$, $L_3$-$WD_5$ may serve as a respective gateway between its self-healing network 100, 122, 123 and the wireless networks supported by the wireless access points AP1 through APm. In some implementations, the combination of the one or more servers 105 and the lead wireless devices $L_1$-$WD_{1,1}$, $L_2$-$WD_{2,1}$, $L_3$-$WD_5$ may be viewed as a network unto itself, such as a peer-to-peer, mesh, or client/server network.

Of course, other network topologies for each of the self-healing networks 100, 122, 123 and/or for one or more on-board networks that include the one or more servers 105, one or more of the lead wireless devices $L_1$-$WD_{1,1}$, $L_2$-$WD_{2,1}$, $L_3$-$WD_5$, and/or one or more other wireless devices WD may be possible and utilized in conjunction with any one or more of the techniques discussed herein. In some embodiments, different network topologies may be utilized for each individual self-healing network 100, 122, 123, and/or for higher level networks that include one or more lead wireless devices $L_1$-$WD_{1,1}$, $L_2$-$WD_{2,1}$, $L_3$-$WD_5$ and/or the one or more servers 105.

In some embodiments, passenger-consumable content (and indeed, any other types of communications) may be delivered between each of the wireless devices $WD_{1,1}$ the lead wireless devices $L_1$-$WD_{1,1}$, $L_2$-$WD_{2,1}$, $L_3$-$WD_5$, and/or the one or more servers 105 by using a publish/subscribe mechanism, method, or protocol. The publish/subscribe mechanism, method, or protocol may be utilized to deliver passenger-consumable content 115, 118 over any type of network topology discussed herein (e.g., mesh, client/server, peer-to-peer, etc.). For example, the nodes of each self-healing network 100, 122, 123 (and optionally of each higher level network that respectively includes one or more lead wireless devices $L_1$-$WD_{1,1}$, $L_2$-$WD_{2,1}$, $L_3$-$WD_5$ and/or the one or more servers 105) may deliver and receive passenger-consumable content by utilizing any of the publish/subscribe techniques described in co-owned U.S. Pat. No. 9,087,193 entitled "Communication System and Method for Nodes Associated with a Vehicle," the entire contents of which are hereby incorporated by reference herein.

Promotion to Lead Wireless Device of On-Board Self-Healing Network

Within a particular self-healing network 100, 122, 123, any wireless device included in the particular self-healing network 100, 122, 123 may be selected, at any time and without any human input or intervention, to serve or function as the lead wireless device of the network 100, 122, 123. Upon selection, the selected wireless device may automatically begin to function as a lead wireless device, again without any human input or intervention, and indeed, without any reconfiguration. That is, any wireless device of the self-healing network 100, 122, 123 may be a "hot spare" for the lead wireless device of the self-healing network 100, 122, 123, or for a newly formed sub-network of the network 100, 122, 123, as will be described in a later section. Moreover, referring to the self-healing network 100 as an example network and for ease of discussion, within the self-healing network 100, the set of wireless devices that are communicatively interconnected (e.g., as shown in FIG. 1, the wireless devices $WD_{1,1}$-$WD_{1,n}$) may cooperate to automatically determine or select which wireless device amongst the set is to function as lead wireless device of the self-healing network 100. Said another way, the set of wireless devices that are communicatively interconnected within the self-healing network 100 (e.g., wireless devices $WD_{1,1}$-$WD_{1,n}$) may communicate therebetween to collectively and cooperatively determine or agree on which particular wireless device amongst the set is to be promoted to function or operate as the lead wireless device $L_1$-$WD_{1,1}$, and thus is to establish a wireless link 108 with a suitable access point on-board the vehicle 102 via which data may be delivered to and from the wireless devices $WD_{1,1}$-$WD_{1,n}$ of the network 100. For example, the set or group of wireless devices $WD_{1,1}$-$WD_{1,n}$ of the self-healing network 100 may collectively determine that the lead wireless device is the particular wireless device of the set or group that is able to establish the most robust wireless connection with one of the on-board access points AP1 to APm (e.g., by comparing respective signal strengths, bit error rates, and/or other measures of wireless channel quality across the devices of the group). Additionally or alternatively, the set of wireless devices $WD_{1,1}$-$WD_{1,n}$ may utilize a promotion protocol (e.g., a protocol similar to that utilized in HSRP (Hot Standby Router Protocol) or VRRP (Virtual Router Redundancy Protocol) methodologies used to select one of a group of routers to serve as the gateway or virtual router on behalf of the group) to collectively select a particular one of the set of wireless devices $WD_{1,1}$-$WD_{1,n}$ to serve as the lead wireless device $L_1$-$WD_{1,1}$ of the network 100. For example, the set of wireless devices $WD_{1,1}$-$WD_{1,n}$ may vote and/or otherwise elect one of the devices of the set/group to function as the lead wireless device $L_1$-$WD_{1,1}$ of the network 100. Still additionally or alternatively, the set of wireless devices $WD_{1,1}$-$WD_{1,n}$ may collectively determine the lead wireless device of the group based on a comparison of each wireless device's spare or available processing power and/or memory. For example, a particular wireless device of the set that is not being utilized by any passenger may be collectively determined by the set of wireless devices $WD_{1,1}$-$WD_{1,n}$ to be the lead wireless device $L_1$-$WD_{1,1}$ of the network 100. Of course, other criteria may additionally or alternatively be used by the set of wireless devices $WD_{1,1}$-$WD_{1,n}$ to collectively determine the particular wireless device amongst the set that is to serve as the lead wireless device $L_1$-$WD_{1,1}$ of the network 100.

Various conditions and/or events may trigger the wireless devices $WD_{1,1}$-$WD_{1,n}$ or a subset thereof to cooperatively determine or select a new lead wireless device. For example, the current lead wireless device may suffer a failure or a compromised condition (e.g., its wireless transceiver fails), the quality and/or capacity of the wireless link 108 may degrade, the access point AP1 to which the self-healing network 100 is communicatively connected may fail, one or more of the communications backbones 112a, 112b may fail or become otherwise compromised, etc. The occurrence of the triggering condition may be detected by the current lead wireless device and/or by one or more other wireless devices within the network 100. Based on the detection, the detecting wireless device(s) may initiate the election process (or other suitable cooperative selection process) to determine a replacement lead wireless device.

Figure 2A:
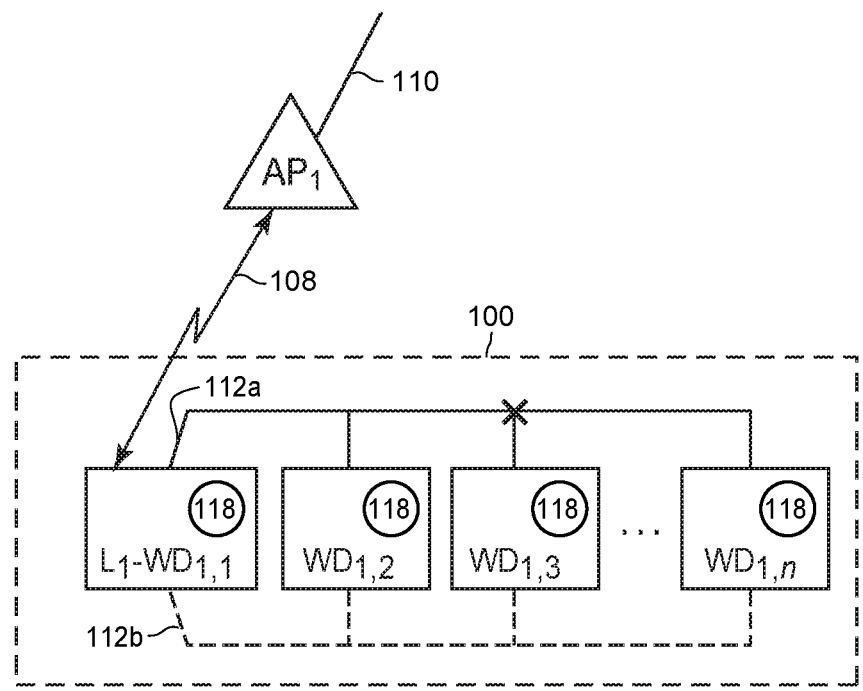
FIGS. 2A-2D illustrate various example faults that may occur in the on-board self-healing network of FIG. 1, and the example fault mitigation and recovery techniques utilized by the nodes of the self-healing network.

Referring to FIGS. 2A-2D to illustrate, FIG. 2A depicts the self-healing network 100 of FIG. 1, including lead wireless device $L_1$-$WD_{1,1}$ and other wireless devices $WD_{1,2}$-$WD_{1,n}$ that are communicatively interconnected via primary communications backbone 112a and via secondary communications backbone 112b. Lead wireless device $L_1$-$WD_{1,1}$ has established and is supporting wireless link 108 to wireless access point AP1, where the wireless link 108 transports data to/from other on-board devices and any number of the wireless devices $WD_{1,1}$-$WD_{1,n}$ of the self-healing network 100. For example, passenger-consumable data stored at the one or more servers 105 may be unicast or multicast to one or more target recipient wireless devices of one or more self-healing networks. For instance, at least some of the data 115 stored at the server(s) 105 may be routed to a target recipient wireless device $WD_{1,3}$ of the self-healing network 100 via the network 110, the access point AP1, the wireless link 108, the lead wireless device $L_1$-$WD_{1,1}$, and the backbone 112a.

In the example scenario illustrated in FIG. 2A, a fault (as denoted by the X) in the communications backbone 112a has occurred, thus preventing nodes $WD_{1,3}$-$WD_{1,n}$ from utilizing backbone 112a to communicate with the lead wireless device $L_1$-$WD_{1,1}$. Any one or more of the impacted devices $WD_{1,3}$-$WD_{1,n}$ and/or the lead wireless device $L_1$-$WD_{1,1}$ may detect the presence of the fault. Upon detection of the fault, the impacted wireless devices $WD_{1,3}$-$WD_{1,n}$ and the lead wireless device $L_1$-$WD_{1,1}$ may utilize the secondary communications backbone 112b to communicate therebetween.

Figure 2B:
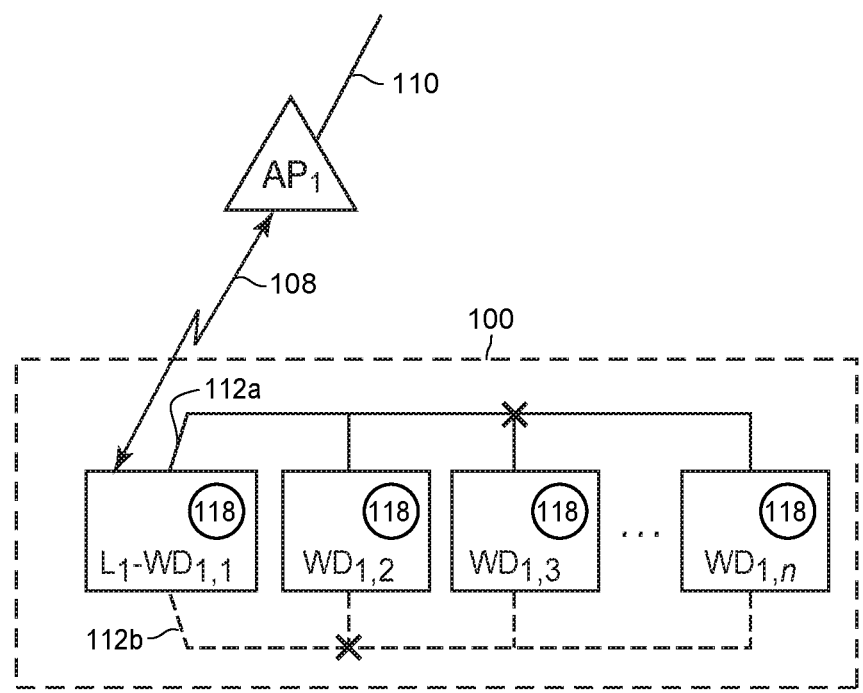

FIG. 2B illustrates the self-healing network 100 of FIG. 2A in which faults have occurred on both the communications backbone 112a and the communications backbone 112b, thereby preventing the devices $WD_{1,3}$-$WD_{1,n}$ from communicating with the lead wireless device $L_1$-$WD_{1,1}$ at all. That is, no viable communications pathway between the lead wireless device $L_1$-$WD_{1,1}$ and the devices $WD_{1,3}$-$WD_{1,n}$ exists. Any one or more of the impacted devices $WD_{1,3}$-$WD_{1,n}$ may detect that it is or has become communicatively disconnected from the lead wireless device $L_1$-$WD_{1,1}$ and, upon said detection, may initiate a process or protocol to determine which other wireless devices of the network 100 remain communicatively connected to the detecting device. For example, each detecting device may broadcast an "I Am Here" message and account for the nodes that successfully reply. When the group of wireless devices that remain communicatively interconnected to each other but are communicatively disconnected to the lead wireless device $L_1$-$WD_{1,n}$ are ascertained, one or more of the members included in said group may initiate an election or other cooperative selection process (e.g., as discussed above) to determine which device is to serve or function as a lead wireless device on behalf of the group. For example, the subset $WD_{1,3}$-$WD_{1,1}$ of the previously communicatively interconnected devices $WD_{1,1}$-$WD_{1,n}$ of the network 100 may determine that the subset $WD_{1,3}$-$WD_{1,n}$ remains communicatively interconnected in spite of being communicatively disconnected from the lead wireless device $L_1$-$WD_{1,1}$, and the subset of devices $WD_{1,3}$-$WD_{1,n}$ may initiate an election or other cooperative process (e.g., as discussed above) to determine or select which device amongst the subset $WD_{1,3}$-$WD_{1,n}$ is to assume the function of the lead wireless device on behalf of the subset $WD_{1,3}$-$WD_{1,n}$. It is noted that the determination of the subset of devices $WD_{1,3}$-$WD_{1,n}$ that remain communicatively interconnected and the initiation of the election process need not be sequentially performed. Indeed, in some implementations, at least some portions of the determination of the subset of devices $WD_{1,3}$-$WD_{1,n}$ that remain communicatively interconnected and the initiation of the election process may occur simultaneously.

Figure 2C:
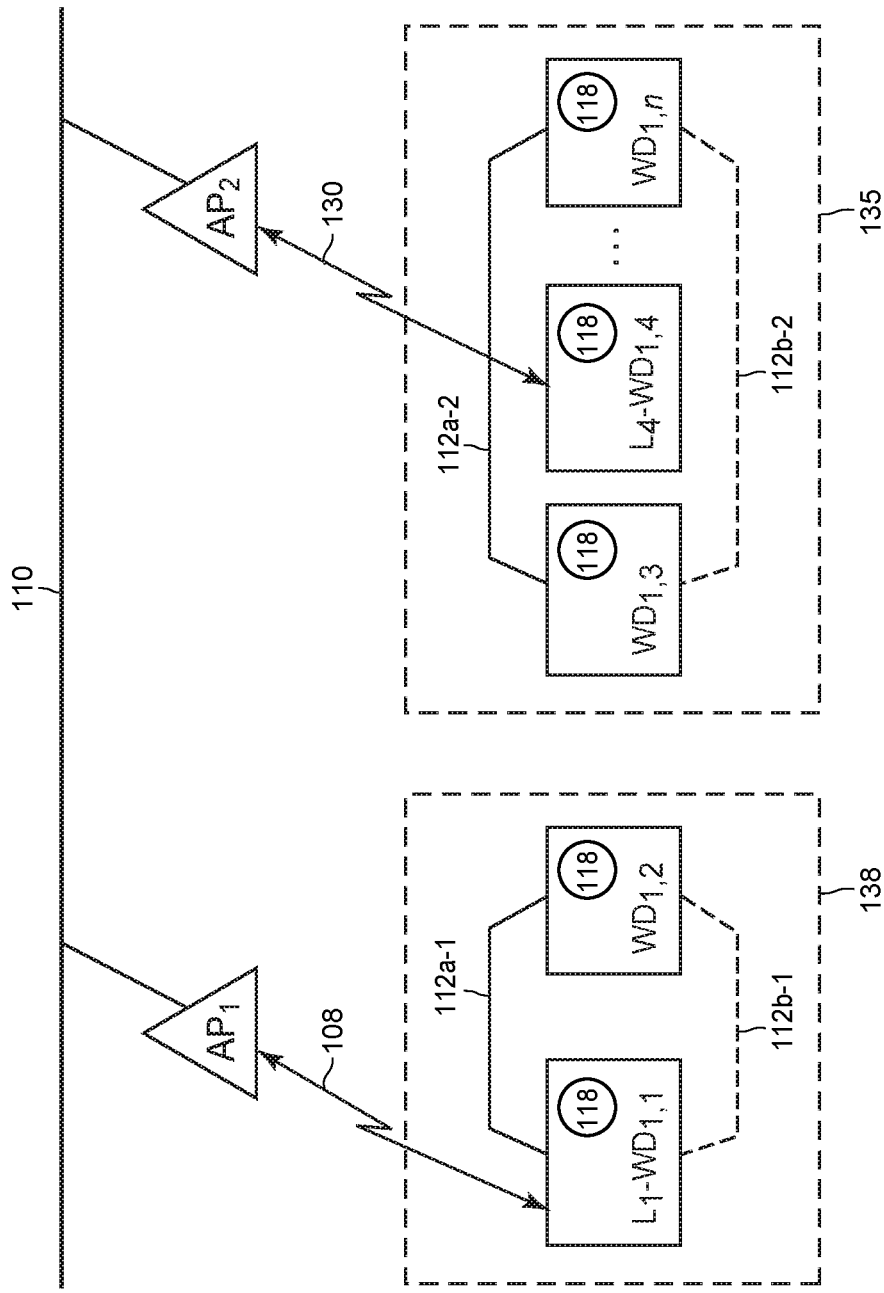

In FIG. 2C, which continues with the example scenario of FIG. 2B, the subset of wireless devices $WD_{1,3}$-$WD_{1,n}$ (e.g., the devices that remain communicatively interconnected while being communicatively disconnected from the lead wireless device $L_1$-$WD_{1,1}$) has determined that device $WD_{1,4}$ is to assume the role of lead wireless device for the subset of wireless devices $WD_{1,3}$-$WD_{1,n}$. Accordingly, newly elected lead wireless device $L_4$-$WD_{1,4}$ may establish a wireless link 130 with a suitable access point on-board the vehicle (e.g., AP2, as shown in FIG. 2C). As such, the self-healing network 100 has automatically mitigated and recovered from the faults in the communications backbones 112a, 112b by self-configuring into two mutually exclusive, viable self-healing networks: (i) the self-healing network 135 that includes wireless devices $WD_{1,3}$ and for which wireless device $WD_{1,4}$ is serving or functioning as the lead wireless device $L_4$-$WD_{1,4}$, and (ii) the self-healing network 138 that includes the remaining wireless devices $WD_{1,1}$-$WD_{1,2}$ of the previous network 100 and for which wireless device $WD_{1,1}$ remains as the lead wireless device $L_1$-$WD_{1,1}$. As depicted in FIG. 2C, each of the self-healing networks 135, 138 includes a respective, mutually exclusive subset of the wireless devices that were previously nodes of self-healing network 100, and includes a respective plurality of communications backbones (e.g., as denoted by references 112a-1, 112b-1 for network 138, and as denoted by references 112a-2, 112b-2 for network 135). Each of the sub-self-healing networks 135, 138 may subdivide to mitigate and recover from respective faults occurring therein, if needed.

Figure 2D:
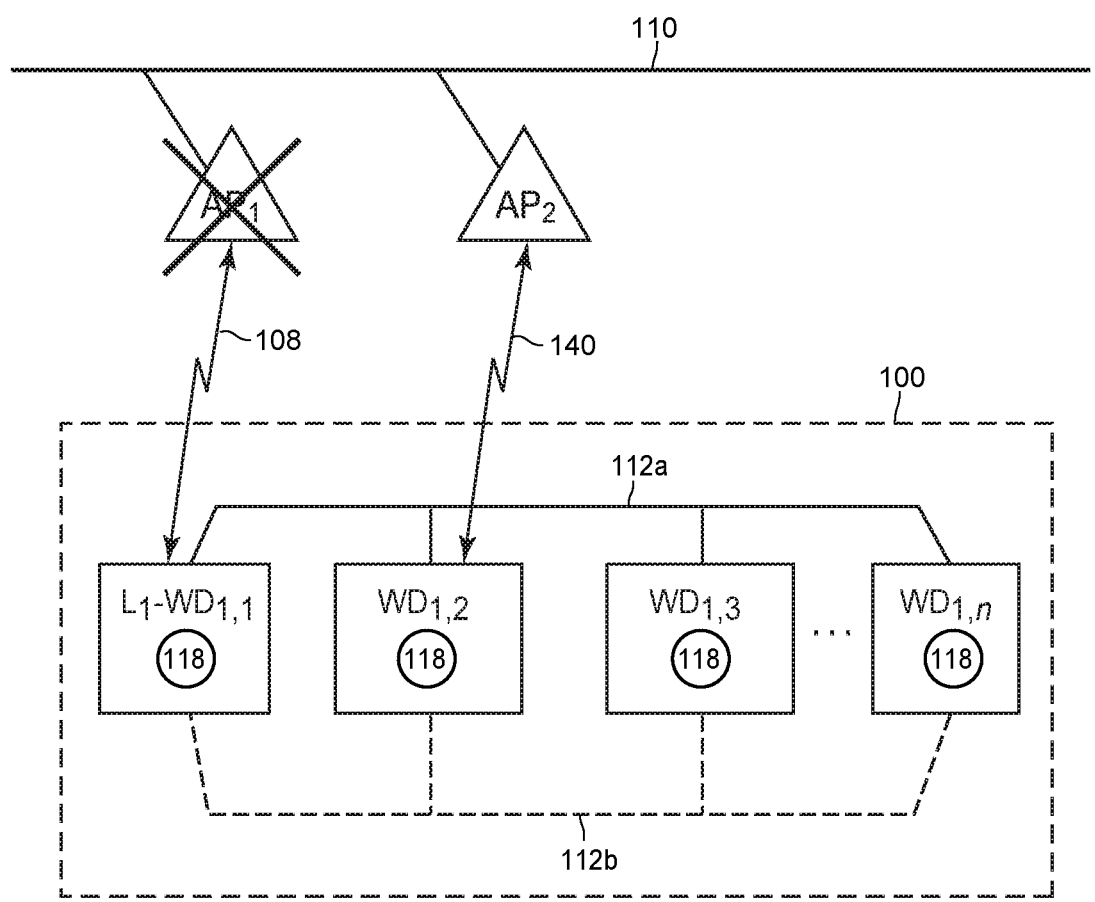

FIG. 2D depicts an embodiment of the self-healing network 100 of FIG. 1 that includes one or more hot standby wireless devices for the active lead wireless device. In FIG. 2D, the network 100 includes a set of wireless devices $WD_{1,1}$ that are communicatively interconnected via primary communications backbone 112a and via secondary communications backbone 112b, where the devices or nodes $WD_{1,1}$ are communicatively connected to other devices onboard the vehicle 102 via the a gateway/lead wireless device $L_1$-$WD_{1,1}$ the wireless link 108, the access point AP1, and the network 110. In the example scenario of FIG. 2D, lead wireless device $L_1$-$WD_{1,1}$ is serving as a primary gateway of the network 100, and the wireless device $WD_{1,2}$ has been designated a priori to be the initial hot standby lead wireless device of the network 100, e.g., via a collective determination by the wireless devices $WD_{1,1}$ or by some other designation mechanism. That is, the wireless device gateway $WD_{1,2}$ has been designated to be the initial hot standby lead wireless device of the network 100 upon initialization of the network 100, and/or at any time prior to the active lead wireless device $L_1$-$WD_{1,1}$ relinquishing or being relieved of its duties as the lead wireless device of the network 100. (Similarly, one or more other wireless devices $WD_{1,3}$ may have been designated a priori as secondary, tertiary, etc. hot standby lead wireless devices for the network 100.)

As denoted by the X in the example scenario depicted in FIG. 2D, access point AP1 has failed. Accordingly, upon detection of the communicative disconnection of the network 100 (e.g., due to failed access point AP1), the initial hot standby wireless device $WD_{1,2}$ automatically assumes the lead wireless device functionality for the network 100, and as such establishes a wireless link 140 with access point AP2 via which connectivity of the network 100 to external devices is maintained. That is, upon detection of the communicative disconnection of the network 100 via lead wireless device $L_1$-$WD_{1,1}$ and access point AP1, initial hot standby wireless device $WD_{1,2}$ automatically starts serving as lead wireless device $L_1$-$WD_{1,2}$ for the network 100, and the wireless device $WD_{1,1}$ automatically relinquishes its lead wireless device responsibilities for the network 100. As such, communication between the devices $WD_{1,1}$-$WD_{1,n}$ of the network 100 and external devices is able to be maintained via gateway/lead wireless device $L_1$-$WD_{1,2}$, the wireless link 140, the access point AP2, and the network 110, with little or no loss of data upon the failure of access point AP1.

In an embodiment, each wireless device $WD_{1,1}$-$WD_{1,n}$ may store an indication of the identity of a particular wireless device within the network 100 that is to serve or is serving as an initial, default, or primary lead wireless device or gateway for the network 100, and each wireless device $WD_{1,1}$-$WD_{1,n}$ may store an indication of one or more wireless devices within the network 100 that are designated as hot standbys for an active lead wireless device of the network 100. Optionally, each wireless device $WD_{1,1}$-$WD_{1,n}$ may store a respective order or priority via which various hot standby wireless devices are to assume lead wireless device functionality. Specifically, in the example scenario of FIG. 2D, an indication of the wireless device $WD_{1,1}$ being designated as the primary lead wireless device of the network 100 and an indication of the wireless device $WD_{1,2}$ being designated as the initial hot standby for the primary lead wireless device may be stored at each wireless device $WD_{1,1}$-$WD_{1,n}$ of the network 100, e.g., upon network initialization, and/or upon determination of the primary and hot standby lead wireless device(s). In an example implementation, the indications of the designated primary and hot standby wireless device(s) stored at each wireless device of the network 100 may include the respective IP addresses or other routing addresses of the designated wireless devices within the network 100 (or indications thereof). As such, data delivery to/from the self-healing network 100 may be maintained with minimal or no socket breakage in the event of an access point failure.

Although the example scenario of FIG. 2D illustrates a hot standby wireless device of a self-healing network 100 automatically assuming the role of lead wireless device upon the failure of an access point AP1, a hot standby may automatically assume the role of lead wireless device in a similar manner during other fault or failure scenarios, such as upon the failure of an active lead wireless device, upon a fault occurring at the active lead wireless device, etc. Further, depending on the nature of its fault, a formerly active lead wireless device may be able to maintain its communicative connection to the backbone(s) 112, and therefore may still be able to send and receive passenger-consumable data, in spite of its loss of wireless connectivity with the access point.

Exemplary Node of On-Board Self-Healing Network

Figure 3:
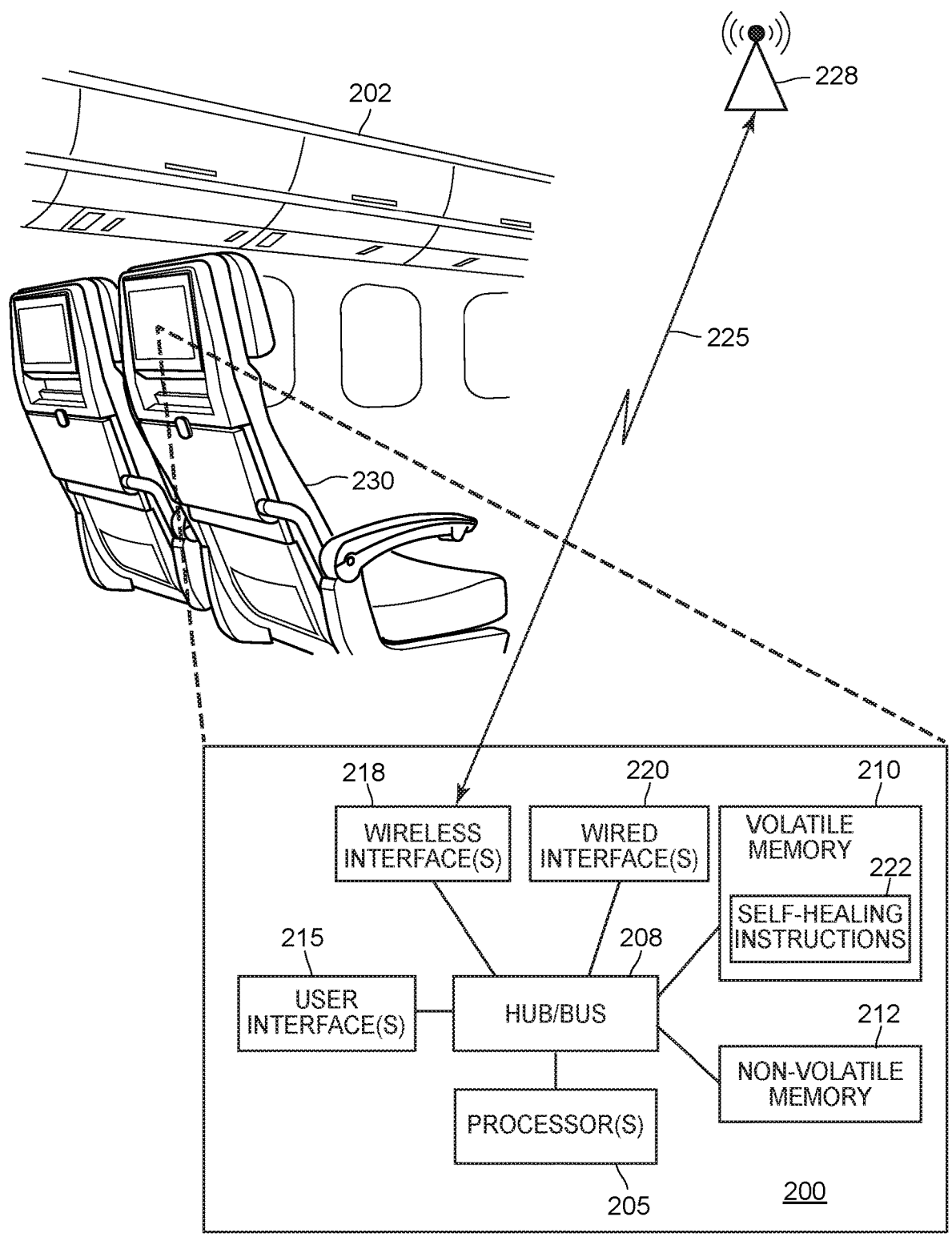
FIG. 3 illustrates a block diagram of an example wireless device configured to operate as a node of the on-board self-healing network of FIG. 1.

FIG. 3 illustrates a block diagram of an example wireless device 200 that may be utilized in one of the self-healing networks 100, 122, 123 of FIG. 1. For example, each of the wireless devices $L_1$-$WD_{1,1}$, $WD_{1,2}$-$WD_{1,n}$, $L_2$-$WD_{2,1}$, $L_3$-$WD_{3,5}$ may be a respective instance of the example wireless device 200.

As depicted in FIG. 3, the wireless device 200 is a passenger-facing device that is disposed in the cabin of a vehicle 202. The wireless device 200 may include, for example, one more central processing units (CPUs) or processors 205, and one or more busses or hubs 208 that connect the processor(s) 205 to other elements of the wireless device 200, such as a volatile memory 210, a non-volatile memory 212, one or more user interfaces 215, one or more wireless interface(s) 218, and optionally, one or more wired interface(s) 220. The volatile memory 210 and the non-volatile memory 212 may each include one or more non-transitory, tangible computer readable storage media such as random access memory (RAM), read only memory (ROM), FLASH memory, a biological memory, a hard disk drive, a digital versatile disk (DVD) disk drive, etc.

In an embodiment, the memory 210 and/or the memory 212 may store instructions 222 that are executable by the processor(s) 205 of the wireless device 200 to particularly operate as a node of a self-healing network on-board a vehicle, e.g., self-healing network 100, 122, 123 on-board the vehicle 102. For example, the self-healing instructions 222 stored on one or more of the memories 212, 215 may, when executed by the processor(s) 205, cause the wireless device 200 to, for example, request and receive, or otherwise obtain from other devices, passenger-consumable content, and present obtained content to a passenger by using the user interface 215; to route communications via appropriate interfaces 218, 220 and communications backbones 112a, 112b; detect that an election-triggering condition has occurred; initiate and/or participate in cooperative elections with other wireless devices; and/or perform any one or more of the other methods, functions, features, or actions described herein. The instructions 222 may be implemented by using one or more modules, applications, engines, and the like. Indeed, each of the modules, applications and engines described herein may respectively correspond to a different set of machine readable instructions for performing one or more functions described herein. These modules need not be implemented as separate software programs, procedures or modules, though, and thus various subsets of these modules can be combined or otherwise re-arranged in various embodiments. In some embodiments, at least one of the memories 210, 212 stores a subset of the modules and data structures identified herein. In other embodiments, at least one of the memories 210, 212 stores additional modules and data structures not described herein.

In an embodiment, the user interface 215 may communicate with the processor(s) 205 to cause information to be presented on the user interface 215 of the wireless device 200. In an embodiment, the user interface 215 may transfer information and commands to/from the processor(s) 205 of the wireless device 200. For example, the user interface 215 may receive a passenger request for particular passenger-consumable content, deliver an indication of the request, via the bus 208 to the processor(s) 205, which in turn may cause the requested content to be delivered from wherever it is stored on-board the vehicle for presentation at the user interface 215. Typically (but not necessarily), the user interface 215 includes a touch screen. Additionally or alternatively, the user interface 215 may include a mouse, a keyboard or key pad, a touch pad, lights, a speaker, a microphone, etc.

Data or information, which may include passenger-consumable content, may be transferred to and from the wireless device 200 via one or more wireless interfaces 218. At least one of the wireless interfaces 218 may be a wireless interface via which a wireless link 225 to an on-board wireless access point 228 (e.g., the wireless link 108 to on-board wireless access point AP1, and/or other wireless links to on-board wireless access points AP1 to APm) may be established, e.g., when the wireless device 200 is functioning as a lead wireless device of a self-healing network. In some embodiments, at least one of the wireless interfaces 218 may couple the wireless device 200 to the communications backbone 112a and/or 112b of the self-healing network of which the wireless device 200 is a node (not shown in FIG. 3). In some embodiments, the wireless device 200 may additionally include one or more wired interfaces 220 via which the wireless device 200 is coupled to the communications backbone 112a and/or 112b of the self-healing network.

In the arrangement depicted in FIG. 3, the wireless device 200 is mounted in the back of a passenger seat 230 of the vehicle, and as such, a passenger who is seated or otherwise positioned behind the seat 230 may be a user (and therefore interact with) the wireless device 200. However, this is merely an example arrangement. Different instances of wireless devices 200 that are configured to operate as nodes in on-board self-healing networks 100, 122, 123 may be disposed otherwise within the vehicle 202. For example, an instance of the wireless device 200 may be mounted within the cabin of a vehicle, e.g., in or on a wall, cabinet, shelf, ceiling, etc. of the vehicle 202. An instance of the wireless device 200 may be mounted in an LRU (Line Replaceable Unit) on-board vehicle 202. Other embodiments of wireless device 200 instances on-board the vehicle 202 may additionally or alternatively be possible.

For example, an instance of the wireless device 200 may be implemented in a portable electronic device (PED) on-board the vehicle 202 that is operated by a passenger or a crew member. In such implementations, the vehicle 202 may include installed mounting devices or ports that are fixedly attached to the vehicle or portion thereof via which a passenger or crew member may mount his or her PED, to thereby communicatively connect their PED to the communications backbones 112a, 112b of a self-healing network 100. For example, a mounting device may be disposed in seat of the vehicle, in a dashboard, wall, or other component of the vehicle. In these embodiments, the mounting device may provide, on behalf of the mounted PED, the wireless interface(s) 218 and wired interface(s) 220 to the communications backbones 112a, 112b of a self-healing network. The PED may be configured with one or more applications (e.g., at least a portion of the self-healing instructions 122 may be stored on and executed at the PED) to thereby enable the PED to operate at least partially as a self-healing network node when mounted in an on-board mounting port or at the on-board mounting device. Typically, for security reasons, a passenger-operated PED may be granted only a subset of the self-healing functionality that is able to be performed by a vehicle-installed wireless device (such as the seatback-mounted device 202) or by a crew member-operated PED. For example, access by other devices to passenger-consumable content that is stored at the PED may be prohibited, whereas the PED may be allowed to detect faults in communications backbones 112a, 112b and inform other nodes of the self-healing network of detected faults.

Further, it is noted that the embodiment of the wireless device 200 illustrated in FIG. 3 is only one example of a device that is suitable for being a node of the self-healing network 100. Other embodiments of the wireless device 200 may be usable as nodes the self-healing network 100, even if the other embodiments have more or fewer components than shown in FIG. 3, have one or more combined components, or have a different configuration or arrangement of the components. Moreover, the various components shown in FIG. 3 can be implemented in hardware, a processor executing software instructions, or a combination of both hardware and a processor executing software instructions, including one or more signal processing and/or application specific integrated circuits.

Exemplary Method

Figure 4:
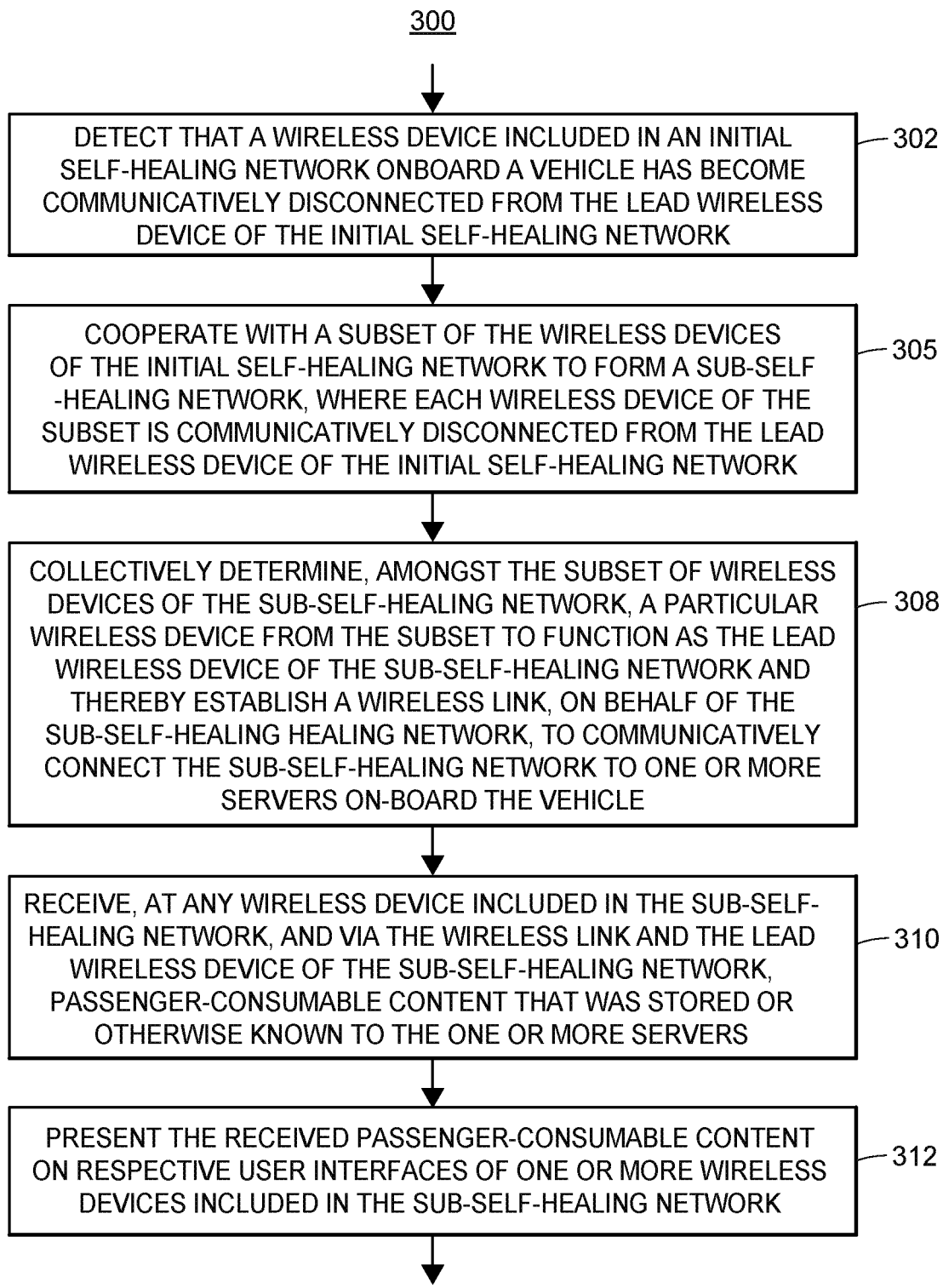
FIG. 4 illustrates an example method for self-healing a network that delivers content for passenger consumption on-board a vehicle.

FIG. 4 illustrates an example method 300 for self-healing a network that is on-board a vehicle and that is for delivering content for consumption by passengers who are on-board the vehicle. In an embodiment, the method 300 is performed by one or more of the wireless devices $WD_{1,1}$-$WD_{1,n}$ that are on-board the vehicle 102 of FIG. 1 and that are included in the self-healing network 100 having lead wireless device $L_1$-$WD_{1,1}$. However, the method 300 may be additionally or alternatively performed by other devices or nodes of the self-healing network 100 and/or by other devices or nodes of other self-healing networks that are on-board vehicles. For ease of discussion, the method 300 is described below with simultaneous reference to FIGS. 1-3; however, this description is only one of many embodiments and as such is understood to be non-limiting.

At a block 302, the method 300 may include detecting, at a particular wireless device, that the particular wireless device is or has become communicatively disconnected from a lead wireless device of an initial self-healing network of which the particular wireless device and the lead wireless device were respective nodes. Generally speaking, prior to the execution of the method 300, the initial self-healing network may include the particular wireless device, the lead wireless device, and zero or more other wireless devices, each of which is a respective node of the initial self-healing network. The nodes of the initial self-healing network may be communicatively connected by one or more communications backbones, which typically, but not necessarily, include a preferred communications backbone (which may be wired or wireless) and optionally one or more secondary communications backbones.

Also typically, but not necessarily, the source or cause of the detected disconnection is not at the particular wireless device itself, but instead may be located external to the particular wireless device, e.g. a fault occurring in a communications link or backbone that communicatively connects the particular wireless device and the lead wireless device, a level of interference that compromises a connecting communications link or backbone so that the link/backbone is operating below a quality threshold, a fault occurring at the lead wireless device, a failure of an access point, etc. As previously discussed, a "lead" wireless device of a self-healing network, as generally referred to herein, refers to one of the wireless devices or nodes of a self-healing network that establishes and maintains, on behalf of the self-healing network, an external wireless link (e.g., "external" with respect to the self-healing network) to other devices that are excluded from the self-healing network via which data and/or other communications (which may include passenger-consumable content) may be sent and received. In an embodiment, the wireless link established by the lead wireless device is an only wireless link that communicatively connects any of the wireless devices of the self-healing network to other external devices on board the vehicle, such as to on-board servers and/or other devices that are excluded from the self-healing network and on which passenger-consumable content is stored. As such, a lead wireless device may serve as a gateway between the wireless devices included in the self-healing network and external devices, so that communications between external devices and any of the wireless devices of the self-healing network are routed via the lead wireless device and its established wireless link. Any of the wireless devices or nodes of a self-healing network may be readily available to assume the functionality of the lead wireless device when needed. Accordingly, each wireless device or node of a self-healing network may be a hot spare for the lead wireless device.

Detecting that the particular wireless device and the lead wireless device are communicatively disconnected (block 302) may include detecting or determining a disconnection, disruption, or absence of any communication pathway between the first and the lead wireless devices. For example, when the initial self-healing network includes a plurality of communications backbones via which its wireless devices or nodes are communicatively interconnected (e.g., communications backbones 112a, 112b), detecting that the particular wireless device and the lead wireless device are communicatively disconnected (block 302) may include detecting that all of the segments of the communications backbones of the initial self-healing network communicatively connecting the particular wireless device and the lead wireless device are unavailable and/or have respective qualities below a quality threshold.

At any rate, at a block 305, the method may include cooperating amongst a subset of the plurality of wireless devices from which the initial self-healing network was formed to form a second self-healing network. The subset of the plurality of wireless devices that form the second self-healing network may include, for example, the particular wireless device and those wireless devices to which the particular wireless device remains communicatively connected and that, along with the particular wireless device, are also communicatively disconnected from the first lead wireless device. Cooperating to form the second self-healing network (block 305) may include collectively determining, by the subset of the plurality of wireless devices, which wireless device amongst the subset is to serve or function as the lead wireless device of the second self-healing network (block 308). The collective determination 308 may be performed by holding an election or other suitable cooperative selection process amongst the subset of the plurality of wireless devices forming the second self-healing network. In an embodiment, the subset of the plurality of wireless devices may collectively utilize a voting or promotion protocol or algorithm, such as a protocol or algorithm similar to HSRP or VRRP, to collectively determine which wireless device is to serve or function as the lead wireless device of the second self-healing network. In one example scenario, based on the collective determination or election, the wireless device that detected the communicative disconnect within the initial self-healing network (e.g., in the method 300 of FIG. 4, the particular wireless device) may be determined and promoted to be the lead wireless device of the second self-healing network. In another example scenario, based on the collective determination or election, another wireless device included in the wireless devices forming the second self-healing network other than the wireless device that detected the communicative disconnect within the initial self-healing network may be determined and promoted to be the lead wireless device.

Upon determining which particular wireless device amongst the subset is to function or serve as the lead wireless device of the second self-healing network (block 308), the particular wireless device may assume the role of lead wireless device, e.g., without requiring any reconfiguration, rebooting, re-starting, re-initialization, and/or human intervention. In an embodiment, the particular wireless device may simply execute computer-executable instructions 222 stored on its memory to cause the particular wireless device to operate as the lead wireless device. For instance, the particular wireless device operating as a lead wireless device may establish, on behalf of the second self-healing network, a wireless link to communicatively connect the wireless devices included in the second self-healing network with other external devices, such as the on-board server and/or other devices that are not nodes of the second self-healing network. In an example implementation, the particular wireless device may establish a wireless link to a wireless access point that is disposed on-board the vehicle and that is communicatively connected to the on-board server. In some arrangements, the wireless link established by the lead wireless device of the second self-healing network is an only wireless link that communicatively connects any of the wireless devices of the second self-healing network to other external devices on board the vehicle, e.g., to other devices on-board the vehicle and external to the second self-healing network, and on which passenger-consumable content is stored. Accordingly, the lead wireless device of the second self-healing network may serve as a gateway between the wireless devices forming the second self-healing network and external devices, so that communications between external devices and any of the wireless devices of the second self-healing network are routed via the newly determined lead wireless device and its newly established wireless link.

In effect, in response to the detected disconnection (block 302), the initial self-healing network automatically self-heals itself by dividing into multiple, mutually exclusive sub-self-healing networks, each of which includes a respective subset of the initial plurality of wireless devices forming the initial self-healing network (block 305), and each of which elects or promotes one of its respective wireless devices to serve or function as its lead wireless device (block 308), and thereby establish a respective wireless link communicatively connecting the sub-self-healing network with external (with respect to the sub-self-healing network) devices on board the vehicle. Advantageously, the self-healing or self-reorganization may occur without (e.g., exclusive of) any user input, instruction, or re-configuration, and/or without any re-booting, re-initializing, or re-start of any of the nodes. It is noted that upon detection of further faults or disconnections within a sub-network, the sub-network may heal itself in a similar manner.

At a block 310, the method 300 may include receiving passenger-consumable content from the on-board server (and/or from any other device at which passenger-consumable content is stored) at any wireless device of the second self-healing network via the lead wireless device of the second self-healing network and its established wireless link. At a block 312, the method 300 may include presenting the received passenger-consumable content on a user interface of the wireless device at which it was received.

In some scenarios, the wireless device that detected the disconnect with the initial self-healing network (e.g., in the method 300 of FIG. 4, the particular wireless device) is collectively determined by the subset of the plurality of wireless devices forming the second self-healing network to be the particular wireless device that is promoted to function or serve as lead wireless device of the second self-healing network. In these scenarios, the method 300 may include receiving, from one or more on-board servers at the particular wireless device functioning as the lead wireless device of the second self-healing network, particular passenger-consumable content that is to be delivered to one or more wireless devices included in the second self-healing network. For example, the particular passenger-consumable content may be received at the particular wireless device via the wireless link established by the particular wireless device with a wireless access point upon being promoted to be the lead wireless device of the second self-healing network.

The particular wireless device functioning as the lead wireless device of the second self-healing network may route or otherwise make locally available the particular passenger-consumable content to one or more recipient wireless devices included in the second self-healing network, which may include itself, in some situations. For example, the received particular passenger-consumable content may be stored at the particular wireless device functioning as the lead wireless device of the second self-healing network, thereby providing local access to the stored particular passenger-consumable content. Upon request of a recipient wireless device, the particular passenger-consumable content stored at the lead wireless device may be routed or otherwise transmitted from the particular wireless device to the one or more recipient wireless devices via one or more of the communications backbones interconnecting the wireless devices of the second self-healing network. In another example, the received passenger-consumable content may be streamed from the particular wireless device functioning as lead wireless device of the second self-healing network to one or more recipient devices, e.g., in real-time as the data stream is received at the particular wireless device via the wireless link, and/or from a memory of the particular wireless device upon request of a recipient wireless device included in the second self-healing network.

In an embodiment, the particular wireless device functioning as the lead wireless device of the second self-healing network may route the particular passenger-consumable content received via the wireless link to one or more particular recipient wireless devices of the second self-healing network for local persistent storage thereon. As such, distributed storage within the wireless devices of the second self-healing network of passenger-consumable content may be implemented, thereby providing wireless devices of the second self-healing network with local access to locally stored passenger-consumable content. For example, other wireless devices within the second self-healing network may request and receive passenger-consumable content that is locally stored at other devices of the second self-healing network.

Generally speaking, within the second self-healing network, one of the plurality of communications backbones may be utilized by the wireless devices of the second self-healing network as a primary transport mechanism for data communications between wireless devices of the second self-healing network, and another one of the plurality of communications backbones may be utilized as a secondary, back-up, or redundant transport mechanism. For example, the wireless devices of the second self-healing network may utilize a wired communications backbone as a preferred communications backbone, and may utilize a different communications backbone (which may be wired or wireless) as a secondary communications backbone. If the second self-healing network does include a wireless communications backbone, said wireless communications backbone typically may be implemented using one or more wireless links that are different than the wireless link established by the lead wireless device of the second self-healing network, e.g., different frequencies, different wireless communication protocols, different channels, etc. Typically the primary or preferred communications backbone has a higher reliability and/or availability than the secondary communications backbone(s).

Additional Considerations

The novel on-board self-healing network for delivery of vehicle passenger-consumable content and its associated methods, components, and/or techniques provide numerous advantages over prior art systems and techniques, as well as solves problems that are introduced or inherent by the prior art system/techniques.

For example, upon the occurrence of a fault within the on-board self-healing network, the network may automatically, and without any human intervention, self-heal or otherwise repair the network to thereby maintain the ability to deliver available passenger-consumable content to passengers with minimal disruption, even when faults occur at a head-end device such as a lead wireless device, and/or even when multiple faults occur across multiple redundant communication paths. For instance, any wireless device included in a self-healing network may automatically assume the role of a lead wireless device of a sub-network of the original self-healing network, e.g., without requiring human intervention, reconfiguration, restarting, and/or re-initialization.

Further, passenger-consumable content may be distributively stored across the one or more servers, one or more lead wireless devices of one or more on-board self-healing networks, and/or one or more non-lead wireless devices included in the one or more self-healing networks, thereby providing ease and speed of access to passenger-consumable content as well as redundancy, e.g., in case of failure of any of the nodes and/or links. With the distributive storage, routing of requests for particular passenger-consumable content may be managed by the one or more servers and/or by the one or more lead wireless devices. That is, one or more servers and/or the one or more lead wireless devices may maintain or store indications of what particular passenger-consumable content is available from which one or more servers, one or more lead wireless devices, and/or one or more self-healing networks. As such, when another device requests particular passenger-consumable content, the one or more servers and/or the one or more lead wireless devices may indicate, to the requesting device, a server, device, and/or self-healing network via which the request to content may be obtained, and/or the one or more servers and/or the one or more lead wireless devices may obtain or access requested content on behalf of the requesting device and delivered the obtained content thereto. In this manner, management and distribution of distributed passenger-consumable content may also be distributed, thereby reducing the processing load of the one or more on-board servers.

Still further, in scenarios in which passenger-consumable content (or copies thereof) is stored within a self-healing network, the devices of the self-healing network no longer need to utilize external links (e.g., the wireless link supported by the lead wireless device for communicating with other devices that are not nodes of the self-healing network) to obtain passenger-consumable content, thereby freeing up bandwidth across the external links for other uses by other devices and applications. This advantage is particular useful in vehicles that utilize wireless links for air-to-ground communications with on-board passenger PEDs, such as in-flight connectivity services in which passenger PEDs communicate with off-board computing devices (e.g., via the wireless links within a vehicle cabin and air-to-ground communications links between the vehicle and stationary ground or base stations) during transit for on-board email, text messaging, telephone calls, off-board website server access, off-board VPN or other network access, and other such applications. For example, as illustrated in FIG. 1, wireless access point AP1 supports both the wireless link 108 via which on-board passenger-consumable content is delivered to/from the wireless devices $WD_{1,1}, \ldots, WD_{1,n}$ of self-healing network 100, as well as supports respective wireless links 140, 142 to $PED_1$ and $PED_2$ via which in-flight air-to-ground connectivity application data is delivered to/from $PED_1$ and $PED_2$. Wireless access point AP2 supports wireless link 125 to self-healing network 122, wireless link 128 to self-healing network 123, and wireless link 145 to $PED_3$. Wireless access point APm supports respective wireless links 148, 150 to $PED_{p-2}$, $PED_{p-1}$, e.g., for in-flight connectivity applications. In these implementations in which multiple on-board wireless links are utilized for multiple types of applications, the routing of at least a portion of the passenger-consumable content that is stored on board the vehicle is offloaded from being transported via the wireless links, thereby freeing up bandwidth on the in-cabin wireless links to support air-to-ground communications and/or other types of communications.

Moreover, the configurations of self-healing networks may be sized to manage on-board wireless link or network usage as desired. For example, on-board self-healing networks may be configured to include larger numbers of wireless devices within each network, so that the overall number of and/or bandwidth of wireless links that service on-board self-healing network devices can be minimized or at least decreased, e.g., as compared to on-board self-healing networks that include smaller numbers of wireless devices within each network. As such, on-board wireless link usage may be at least partially freed up (e.g., and in some cases, dynamically managed while the vehicle is in transit) to service the wireless link needs and usage of devices and applications other than those providing on-board passenger-consumable content. Indeed, in configurations in which copies of all available passenger-consumable content are respectively stored within each on-board self-healing network, external wireless link usage due to passenger-consumable content requests of self-healing network devices may be minimal or even zero.

Additionally, the ability of passenger-consumable content to be initially loaded onto a vehicle via one or more wireless devices that are nodes of an on-board self-healing network, and then automatically detected and distributed so that the newly-loaded passenger-consumable content is made available to most or all passenger-facing devices on-board the vehicle, significantly reduces the time and bandwidth needed to load passenger-consumable content onto the vehicle (which in turn, may significantly decrease the gate time needed to prepare the vehicle for a subsequent journey). For example, instead of downloading or otherwise transferring a massive data file onto the on-board servers 105 at a parking gate, which may tie up the bandwidth of gate wireless links, portions of the passenger-consumable content may be distributively stored on multiple wireless devices prior to their installation on-board the vehicle. The multiple wireless devices may be respectively installed or swapped into their respective locations, e.g., in seatbacks or other mounting locations on-board the vehicle. In this manner, wireless bandwidth at the gate is freed up for other purposes, and redundancy of initially loaded data may be provided across multiple wireless devices.

Further, the novel systems, methods, components, and techniques disclosed herein allow for faster and lower cost of vehicle construction and installation, as self-healing networks may be line-fit installed during the manufacturing stage of the vehicle (as contrasted with being retrofitted and/or provisioned after the manufactured vehicle has been delivered to its operating company). For example, aircraft, trains, and subway transit vehicles typically manufacture rows of seats that are installed as a single block of multiple seats. With the novel techniques disclosed herein, each block of multiple seats may be manufactured to include its own self-healing network, including the necessary passenger-facing wireless devices, communication backbone(s), and wireless interfaces. Upon installation and initialization within the vehicle, the wireless devices may automatically self-configure to communicatively interconnect with one another to form the active self-healing network, and, if needed, determine a lead wireless device to establish a wireless link on the network's behalf to other on-board networks and devices, e.g., via on-board wireless access points. As such, multiple self-healing networks may initialize on-board the vehicle at least partially in parallel rather than sequentially, as is required by known prior art that requires servers to coordinate the on-board initialization. Accordingly, the speed of initialization across self-healing network devices may be increased, which may result in less downtime and quicker time-to-operations of the vehicle. Similar benefits are afforded when maintenance and/or repair need to be performed, as either a block of multiple seats may be replaced, or a single wireless device within a self-healing network may be replaced, with minimal downtime and effect on other passenger-facing wireless devices.

Of course, the novel systems, methods and techniques related to an on-board self-healing network for delivery of vehicle passenger-consumable content described herein are not limited to only the above examples, nor are their benefits and advantages limited to those described above. Many other applications and benefits are possible by using the systems, methods, and/or techniques described herein.

Furthermore, when implemented, any of the methods and techniques described herein or portions thereof may be performed by executing software one or more non-transitory, tangible, computer readable storage media or memories such as magnetic disks, laser disks, optical discs, semiconductor memories, biological memories, other memory devices, or other storage media, in a RAM or ROM of a computer or processor, etc.

Moreover, although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims. By way of example, and not limitation, the disclosure herein contemplates at least the following aspects:

1. A self-healing network for delivering content for consumption by passengers on-board a vehicle may comprise a plurality of wireless devices that are disposed on-board the vehicle and communicatively interconnected. Each wireless device included in the plurality of wireless devices may include a respective processor, a respective memory, and respective computer-executable instructions stored on the respective memory that, when executed by the respective processor, cause the each wireless device to cooperate with the other wireless devices included in the plurality of wireless devices to determine that a particular wireless device of the plurality of wireless devices is to function as a lead wireless device of the self-healing network. When the each wireless device is determined by the plurality of wireless devices to function as the lead wireless device of the self-healing network, the computer-executable instructions may be executed to cause the each wireless device to establish, via a wireless transceiver included in the each wireless device, a wireless link communicatively connecting any wireless device of the plurality of wireless devices of the self-healing network and one or more servers. The one or more servers may be disposed on-board the vehicle and may store at least some of available on-board passenger-consumable content, so that the each wireless device, while functioning as the lead wireless device of the self-healing network, serves as a gateway (i) between the plurality of wireless devices of the self-healing network and the one or more servers, and (ii) via which respective at least portions of the passenger-consumable content are delivered to respective wireless devices of the self-healing network, e.g., for display or presentation at a respective user interfaces of the respective wireless devices.

2. self-healing network of the previous aspect, wherein at least some of the plurality of wireless devices are mounted within a cabin of the vehicle.

3. The self-healing network of any one of the previous aspects, wherein each of at least one of the plurality of wireless devices is mounted in a respective seat disposed in the cabin of the vehicle.

4. The self-healing network of any one of the previous aspects, wherein the each wireless device further includes a wired interface, and the plurality of wireless devices are communicatively interconnected via the respective wired interfaces to a wired communications backbone of the self-healing network.

5. The self-healing network of any one of the previous aspects, wherein: each wireless device includes at least one wireless transceiver; and the plurality of wireless devices are communicatively interconnected, via the respective at least one wireless transceivers, to a wireless communications backbone of the self-healing network, the wireless communications backbone comprising one or more wireless links that are different than the wireless link communicatively connecting the self-healing network and the one or more servers.

6. The self-healing network of any one of the previous aspects, wherein the one or more wireless links communicatively interconnecting the plurality of wireless devices and the wireless link that communicatively connects the self-healing network with the one or more servers utilize different channels.

7. The self-healing network of any one of the previous aspects, wherein the one or more wireless links communicatively interconnecting the plurality of wireless devices and the wireless link that communicatively connects the self-healing network with the one or more servers utilize different frequency bands.

8. The self-healing network of any one of the previous aspects, wherein the wired communications backbone is a preferred communications backbone of the self-healing network, and the wireless communications backbone is a secondary communications backbone of the self-healing network.

9. The self-healing network of any one of the previous aspects, wherein the self-healing network is an initial self-healing network and the plurality of wireless devices is an initial set of wireless devices; and wherein the respective computer executable instructions stored on the respective memory of the each wireless device are further executable by the respective processor to, while the each wireless device is not functioning as the lead wireless device of the initial self-healing network: detect that a communicative connection between the each wireless device and the lead wireless device of the initial self-healing network has a quality less than a threshold; based on the detection, determine that respective qualities of respective communicative connections between the each wireless device and each wireless device included in a subset of the initial set of wireless devices are at or above the threshold; based on the determination, form, with the subset of the initial set of wireless devices, a subsequent self-healing network, the subsequent self-healing network excluding the lead wireless device of the initial self-healing network and including the each wireless device and the subset of the initial set of wireless devices; and cooperate with the other wireless devices included in the subsequent self-healing network to promote one of the wireless devices included in the subsequent self-healing network to function as a lead wireless device of the subsequent self-healing network so that the lead wireless device of the subsequent self-healing network serves as a gateway (i) between the wireless devices of the subsequent self-healing network and the one or more servers, and (ii) via which respective at least portions of passenger-consumable content are delivered to respective wireless devices of the subsequent self-healing network.

10. The self-healing network of any one of the previous aspects, wherein the each wireless device is communicatively connected to the initial lead wireless device of the initial self-healing network via more than one communications backbone, and wherein the detection that the communicative connection between each wireless device and the initial lead wireless device of the initial self-healing network has the quality less than the threshold comprise a respective detection that a respective communicative connection between the each wireless device and the initial lead wireless device of the initial self-healing network via each of the more than one communications backbone has a respective quality less than a respective threshold.

11. The self-healing network of any one of the previous aspects, wherein: the wireless link is established between the lead wireless device and a wireless access point; and the wireless access point is disposed on-board the vehicle and communicatively connected to the one or more servers via one or more wired links.

12. The self-healing network of any one of the previous aspects, wherein the wireless access point further supports one or more additional wireless links to one or more personal electronic devices (PEDs) operated by one or more passengers on-board the vehicle, the one or more additional wireless links supporting data communications between the one or more PEDs and one or more computing devices located off-board the vehicle.

13. The self-healing network of any one of the previous aspects, wherein the plurality of wireless devices cooperate via an election to determine the particular wireless device that is to be promoted to function as the lead wireless device of the self-healing network.

14. The self-healing network of any one of the previous aspects, wherein the plurality of wireless seatback devices are communicatively interconnect via a token ring.

15. The self-healing network of any one of aspects 1-13, wherein the plurality of wireless seatback devices are communicatively interconnect via a hub.

16. The self-healing network of any one of aspects 1-13, wherein the self-healing network is a mesh network.

17. The self-healing network of any one of the previous aspects, wherein the available passenger-consumable content stored on the one or more servers is a first portion of the available passenger-consumable content, and wherein a second portion of available passenger-consumable content is stored on one or more wireless devices included in the self-healing network.

18. The self-healing network of any one of the previous aspects, wherein the wireless link communicatively connecting any wireless device of the self-healing network and the one or more servers is an only wireless link communicatively connecting any wireless device of the self-healing network and the one or more servers.

19. A method for self-healing a network that is on-board a vehicle and that is for delivering content for consumption by passengers on-board the vehicle, the method comprising:

detecting, at a particular wireless device included in a plurality of wireless devices that are communicatively interconnected to form a first self-healing network, that the particular wireless device is communicatively disconnected from a first lead wireless device of the first self-healing network, the first lead wireless device of the first self-healing network supporting a first wireless link that communicatively connects the plurality of wireless devices of the first self-healing network to an on-board server;

based on the detection, cooperating, between the particular wireless device and other wireless devices with which the particular wireless device remains communicatively connected and that, along with the particular wireless device, are communicatively disconnected from the first lead wireless device, to form a second self-healing network, including collectively determining a particular wireless device of the second self-healing network that is to function as a second lead wireless device of the second self-healing network and thereby establish a second wireless link that communicatively connects the set of wireless devices forming the second self-healing network to the on-board server;

receiving, at the particular wireless device from the on-board server via the second wireless link and the second lead wireless device, passenger-consumable content; and presenting the received passenger-consumable content at a user interface of the particular wireless device.

20. The method of aspect 19, wherein the second wireless link is an only wireless link communicatively connecting any wireless device included in the second self-healing network to the on-board server.

21. The method of any one of aspects 19-20, wherein the first self-healing network includes a plurality of communication backbones, and wherein detecting, by the particular wireless device, that the particular wireless device is communicatively disconnected from the first lead wireless device of the first self-healing network comprises detecting, by the particular wireless device, an absence of any communication pathway between the particular wireless device and the first lead wireless device of the first self-healing network via the plurality of communication backbones.

22. The method of any one of aspects 19-21, wherein detecting, by the particular wireless device, the absence of any communication pathway between the particular wireless device and the first lead wireless device of the first self-healing network comprises receiving, from another wireless device included in the second self-healing network, an indication of the absence of any communication pathway between the particular wireless device and the first lead wireless device.

23. The method of any one of aspects 19-22, wherein collectively determining the particular wireless device of the second self-healing network that is to function as the second lead wireless device of the second self-healing network comprises electing, by utilizing a voting protocol amongst the set of wireless devices forming the second self-healing network, the particular wireless device to function as the second lead wireless device of the second self-healing network.

24. The method of any one of aspects 19-23, wherein the particular wireless device is collectively determined to function as the second lead wireless device of the second self-healing network, and the method further comprises: establishing, by the particular wireless device functioning as the second lead wireless device, the second wireless link between the particular wireless device and a wireless access point that is communicatively connected to the on-board server; receiving, from the on-board server at the particular wireless device functioning as the second lead wireless device via the wireless access point and the second wireless link, particular passenger-consumable content; and routing, by the particular wireless device functioning as the second lead wireless device and via a communications backbone of the second self-healing network, the particular passenger-consumable content to a recipient wireless device included in the second self-healing network.

25. The method of any one of aspects 19-24, wherein routing, by the particular wireless device functioning as the second lead wireless device, the particular passenger-consumable content to the recipient wireless device comprises: storing the particular passenger-consumable content at the particular wireless device functioning as the second lead wireless device of the second self-healing network, thereby providing, to the wireless devices of the second self-healing network, local access to the passenger-consumable content within the second self-healing network; and routing the stored passenger-consumable content to the recipient wireless device upon request of the recipient wireless device.

26. The method of any one of aspects 19-25, wherein prouting the particular passenger-consumable content to the recipient wireless device comprises streaming the particular passenger-consumable content to the recipient wireless device.

27. The method of any one of aspects 19-26, wherein routing, by the particular wireless device functioning as a second lead wireless device, the particular passenger-consumable content to the recipient wireless device comprises routing, by the particular wireless device, the particular passenger-consumable content for storage at the recipient wireless device to thereby provide, to the wireless devices of the second self-healing network, local access to the particular passenger-consumable content within the second self-healing network via the recipient wireless device.

28. The method of any one of aspects 19-27, wherein: the communications backbone of the second self-healing network is included in a plurality of communications backbones of the second self-healing network; and wherein routing, by the particular wireless device, particular passenger-consumable content to the recipient wireless device via the communications backbone of the second self-healing network comprises: routing the particular passenger-consumable content from the particular wireless device to the recipient wireless device via a preferred communications backbone included in the plurality of communications backbones of the second self-healing network when the preferred communications backbone is available; and routing the particular passenger-consumable content from the particular wireless device to the recipient wireless device via a secondary communications backbone of the plurality of communications backbones of the second self-healing network when the preferred communications backbone is unavailable.

29. The method of any one of aspects 19-28, further comprising: detecting, by the particular wireless device functioning as the second lead wireless device, that an additional wireless device has joined the second self-healing network, the additional wireless device storing additional passenger-consumable content thereon; and transmitting, by the particular wireless device functioning as the second lead wireless device and via the second wireless link, an indication of the additional passenger-consumable content to the on-board server, thereby providing, to other devices on-board the vehicle and excluded from the second self-healing network, access to the additional passenger-consumable content.

30. The method of any one of aspects 19-29, further comprising obtaining, at the particular wireless device functioning as the second lead wireless device and via the communications backbone of the second self-healing network, the additional passenger-consumable content from the additional wireless device.

31. The method of any one of aspects 19-30, wherein transmitting the indication of the additional passenger consumable content to the on-board server comprises transmitting the additional passenger-consumable content for storage at the on-board server, and wherein the other devices on board the vehicle and excluded from the second self-healing network obtain the additional passenger-consumer content from the on-board server.

32. The method of any one of aspects 19-31, further comprising storing the additional passenger-consumable content at the particular wireless device functioning as the second lead wireless device, and wherein the other devices excluded from the second self-healing network obtain the additional passenger-consumable content from the particular wireless device functioning as the second lead wireless device.

33. The method of any one of aspects 19-32, wherein collectively determining the specific wireless device of the second self-healing network that is to function as a second lead wireless device of the second self-healing network comprises storing, at each wireless device of the self-healing network and prior to detecting that the particular wireless device is communicatively disconnected from the first lead wireless device of the first self-healing network, an indication of the specific wireless device that is to function as the second lead wireless device.

34. The method of any one of aspects 19-33, performed by any one of the self-healing networks of aspects 1-18.

3. Any one of the previous aspects in combination with any other one of the previous aspects.

Thus, many modifications and variations may be made in the techniques, methods, and structures described and illustrated herein without departing from the spirit and scope of the present claims. Accordingly, it should be understood that the methods and apparatus described herein are illustrative only and are not limiting upon the scope of the claims.

What is claimed:

1. A self-healing network for delivering content for consumption by passengers on-board a vehicle, the self-healing network comprising:
   a plurality of wireless devices that are disposed on-board the vehicle and communicatively interconnected with a first lead wireless device, the first lead wireless device serving as a gateway between the plurality of wireless devices and one or more servers disposed on-board the vehicle, each wireless device included in the plurality of wireless devices including a respective processor, a respective memory, and respective computer-executable instructions stored on the respective memory that, when executed by the respective processor, cause the each wireless device to:
   based on a detection that the first lead wireless device has become communicatively disconnected from the plurality of wireless devices, cooperate with other wireless devices included in the plurality of wireless devices to determine that a particular wireless device of the plurality of wireless devices is to function as a second lead wireless device, the cooperation including a comparison of a respective vote provided by the each wireless device, and the particular wireless device being an only wireless device of the plurality of wireless devices that is to function as the second lead wireless device; and
   when the each wireless device is determined by the plurality of wireless devices to be the particular wireless device that is to function as the second lead wireless device, establish, via a wireless transceiver included in the each wireless device, a wireless link communicatively connecting any wireless device of the plurality of wireless devices with the one or more servers so that the each wireless device, while functioning as the second lead wireless device, serves as the gateway (i) between the plurality of wireless devices and the one or more servers, and (ii) via which respective at least portions of passenger-consumable content stored on the one or more servers are delivered to respective wireless devices of the plurality of wireless devices.

2. The self-healing network of claim 1, wherein at least some of the plurality of wireless devices are mounted within a cabin of the vehicle.

3. The self-healing network of claim 1, wherein the each wireless device further includes a wired interface, and the plurality of wireless devices are communicatively interconnected via the respective wired interfaces to a wired communications backbone of the self-healing network, the wired communications backbone being a preferred communications backbone utilized by the plurality of wireless devices to communicate with other wireless devices of the self-healing network.

4. The self-healing network of claim 1, wherein:
   each wireless device includes a first wireless transceiver configured to support the wireless link communicatively connecting the self-healing network with the one or more servers; and
   the plurality of wireless devices are communicatively interconnected, via respective second wireless transceivers, to a wireless communications backbone of the self-healing network, the wireless communications backbone comprising one or more wireless links that are different than the wireless link communicatively connecting the self-healing network with the one or more servers.

5. The self-healing network of claim 4, wherein the one or more wireless links communicatively interconnecting the plurality of wireless devices and the wireless link that communicatively connects the self-healing network with the one or more servers utilize at least one of different channels or different frequency bands.

6. The self-healing network of claim 1, wherein:
the wireless link is established between the particular wireless device functioning as the second lead wireless device and a wireless access point; and
the wireless access point is disposed on-board the vehicle and communicatively connected to the one or more servers via one or more wired links.

7. The self-healing network of claim 6, wherein the wireless access point further supports one or more additional wireless links to one or more personal electronic devices (PEDs) operated by one or more passengers on-board the vehicle, the one or more additional wireless links supporting data communications between the one or more PEDs and one or more computing devices located off-board the vehicle.

8. The self-healing network of claim 1, wherein the each wireless device provides the respective vote, and plurality of wireless devices cooperates via an election, based on the respective votes provided by the plurality of the wireless devices, to determine the particular wireless device that is to be promoted to function as the second lead wireless device of the self-healing network.

9. The self-healing network of claim 1, wherein the plurality of wireless devices communicatively interconnect via a token ring, a hub, or a mesh network configuration.

10. The self-healing network of claim 1, wherein the passenger-consumable content stored on the one or more servers is a first portion of available passenger-consumable content, and wherein a second portion of the available passenger-consumable content is stored on one or more wireless devices included in the self-healing network.

11. The self-healing network of claim 1, wherein the wireless link communicatively connecting any wireless device of the self-healing network and the one or more servers is an only wireless link communicatively connecting any wireless device of the self-healing network and the one or more servers.

12. A method for self-healing a network that is on-board a vehicle and that is for delivering content for consumption by passengers on-board the vehicle, the method comprising:
at a particular wireless device included in a plurality of wireless devices that are communicatively interconnected to form a first self-healing network, the plurality of wireless devices of the first self-healing network including a first lead wireless device supporting a first wireless link that communicatively connects the first self-healing network to an on-board server, detecting that the particular wireless device is communicatively disconnected from the first lead wireless device of the first self-healing network;
based on the detection, cooperating, between the particular wireless device and other wireless devices with which the particular wireless device remains communicatively connected and that, along with the particular wireless device, are communicatively disconnected from the first lead wireless device, to form a second self-healing network, including collectively designating a specific wireless device of the second self-healing network that is to function as a second lead wireless device of the second self-healing network, the collectively designating including a comparison of a respective vote provided by the particular wireless device and each of the other wireless devices with which the particular wireless device remains communicatively connected, and thereby establish a second wireless link that is an only wireless link communicatively connecting any wireless device included in the second self-healing network to the on-board server;
receiving, at the particular wireless device from the on-board server via the second wireless link and the second lead wireless device, passenger-consumable content; and
presenting the received passenger-consumable content at a user interface of the particular wireless device.

13. The method of claim 12, wherein the first self-healing network includes a plurality of communication backbones, and wherein detecting, by the particular wireless device, that the particular wireless device is communicatively disconnected from the first lead wireless device of the first self-healing network comprises at least one of:
detecting, by the particular wireless device, an absence of any communication pathway between the particular wireless device and the first lead wireless device of the first self-healing network via the plurality of communication backbones; or
receiving, from another wireless device included in the second self-healing network, an indication of the absence of any communication pathway between the particular wireless device and the first lead wireless device.

14. The method of claim 12, wherein the particular wireless device and the each of the other wireless devices with which the particular wireless device remains communicatively connected provides the respective vote, and collectively designating the specific wireless device of the second self-healing network that is to function as the second lead wireless device of the second self-healing network comprises electing the specific wireless device by utilizing a voting protocol amongst the set of wireless devices forming the second self-healing network.

15. The method of claim 12, wherein the particular wireless device is the specific wireless device collectively designated to function as the second lead wireless device of the second self-healing network, and the method further comprises:
establishing, by the particular wireless device functioning as the second lead wireless device, the second wireless link between the particular wireless device and a wireless access point that is communicatively connected to the on-board server;
receiving, from the on-board server at the particular wireless device functioning as the second lead wireless device via the wireless access point and the second wireless link, particular passenger-consumable content; and
routing, by the particular wireless device functioning as the second lead wireless device and via a communications backbone of the second self-healing network, the particular passenger-consumable content to a recipient wireless device included in the second self-healing network.

16. The method of claim 15, wherein routing, by the particular wireless device functioning as the second lead wireless device, the particular passenger-consumable content to the recipient wireless device comprises:
storing the particular passenger-consumable content at one of the wireless devices included in the second self-healing network, thereby providing, to each wireless device included in second self-healing network, local access to the passenger-consumable content within the second self-healing network; and routing or streaming the stored passenger-consumable content to the recipient wireless device upon request of the recipient wireless device.

17. The method of claim 15, further comprising:

detecting, by the particular wireless device functioning as the second lead wireless device, that an additional wireless device has joined the second self-healing network, the additional wireless device storing additional passenger-consumable content thereon; and transmitting, by the particular wireless device functioning as the second lead wireless device and via the second wireless link, an indication of the additional passenger-consumable content to the on-board server, thereby providing, to other devices on-board the vehicle and excluded from the second self-healing network, access to the additional passenger-consumable content.

18. The method of claim 17, further comprising obtaining, at the particular wireless device functioning as the second lead wireless device and a communications backbone of the second self-healing network, the additional passenger-consumable content from the additional wireless device, the communications backbone being a wired communications backbone.

19. The method of claim 17, wherein transmitting the indication of the additional passenger-consumable content to the on-board server comprises transmitting the additional passenger-consumable content for storage at the on-board server, and wherein the other devices on board the vehicle and excluded from the second self-healing network obtain the additional passenger-consumer content from the on-board server.

20. The method of claim 17, further comprising storing the additional passenger-consumable content at the particular wireless device functioning as the second lead wireless device, and wherein the other devices excluded from the second self-healing network obtain the additional passenger-consumable content from the particular wireless device functioning as the second lead wireless device.

21. The method of claim 12, wherein collectively designating the specific wireless device of the second self-healing network that is to function as a second lead wireless device of the second self-healing network comprises storing, at each wireless device of the self-healing network and prior to detecting that the particular wireless device is communicatively disconnected from the first lead wireless device of the first self-healing network, an indication of the specific wireless device that is to function as the second lead wireless device.

* * * * *